US008036195B2

(12) United States Patent  (10) Patent No.: US 8,036,195 B2
Thompson et al.  (45) Date of Patent: *Oct. 11, 2011

(54) SYSTEM AND METHOD FOR CONCURRENTLY UTILIZING MULTIPLE SYSTEM IDENTIFIERS

(75) Inventors: James Thompson, Austin, TX (US); Kathleen E. McClelland, Austin, TX (US); Brett B. Stewart, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/722,205

(22) Filed: Mar. 11, 2010

(65) Prior Publication Data

US 2010/0202428 A1  Aug. 12, 2010

Related U.S. Application Data

(60) Continuation of application No. 10/848,897, filed on May 19, 2004, now Pat. No. 7,701,912, which is a division of application No. 09/767,374, filed on Jan. 22, 2001, which is a continuation-in-part of application No. 09/551,291, filed on Apr. 18, 2000, now Pat. No. 6,732,176.

(51) Int. Cl.
  *H04W 4/00* (2009.01)
(52) U.S. Cl. ..................................................... 370/338
(58) Field of Classification Search .................. 370/338, 370/401, 400, 395, 389; 455/435, 439, 433; 709/227, 228, 229
See application file for complete search history.

(56) References Cited

U.S. PATENT DOCUMENTS

| 5,371,794 A | 12/1994 | Diffie et al. |
| 5,461,627 A | 10/1995 | Rypinski |
| 5,654,959 A | 8/1997 | Baker et al. |
| 5,717,688 A | 2/1998 | Belanger et al. |
| 5,729,680 A | 3/1998 | Belanger et al. |

(Continued)

FOREIGN PATENT DOCUMENTS

EP  0 779 752  6/1997

(Continued)

OTHER PUBLICATIONS

Bhagwat et al. "Transparent Resource Discovery for Mobile Computers", Jun. 1995 IEEE, pp. 116-118.

(Continued)

*Primary Examiner* — Hassan Phillips
*Assistant Examiner* — Prenell Jones
(74) *Attorney, Agent, or Firm* — Baker Botts L.L.P.

(57) ABSTRACT

System and Method for providing access to multiple wireless service providers (WSPs) on a shared network infrastructure. The system includes a plurality of access points (Aps) coupled to a network which may be distributed in airports, mass-transit stations, businesses, etc. The network may couple to a wide area network, such as the Internet. Each AP may include a plurality of virtual Aps (VAPs), each corresponding to a WSP. A portable computing device (PCD) of a user stores identification information indicating a WSP of a plurality of possible WSPs, and which may include an access level of the user. Each AP "listens for" or detects identification information associated with numerous WSPs. When the AP receives the identification information from the PCD, it determines the VAP/WSP for the PCD using the identification information. Network access is then provided to the PCD through the determined WSP at the determined access level.

20 Claims, 7 Drawing Sheets

U.S. PATENT DOCUMENTS

| | | | |
|---|---|---|---|
| 5,740,166 A | 4/1998 | Ekemark et al. |
| 5,796,727 A | 8/1998 | Harrison et al. |
| 5,835,061 A | 11/1998 | Stewart |
| 5,875,186 A | 2/1999 | Belanger et al. |
| 5,907,544 A | 5/1999 | Rypinski |
| 5,923,702 A | 7/1999 | Brenner et al. |
| 5,950,130 A | 9/1999 | Coursey |
| 5,969,678 A | 10/1999 | Stewart |
| 5,991,287 A | 11/1999 | Diepstraten et al. |
| 6,026,151 A | 2/2000 | Bauer et al. |
| 6,058,106 A | 5/2000 | Cudak et al. |
| 6,067,297 A | 5/2000 | Beach |
| 6,098,106 A | 8/2000 | Philyaw et al. |
| 6,144,645 A | 11/2000 | Struhsaker et al. |
| 6,154,637 A | 11/2000 | Wright et al. |
| 6,205,478 B1 | 3/2001 | Sugano et al. |
| 6,226,277 B1 | 5/2001 | Chuah |
| 6,230,012 B1 | 5/2001 | Willkie et al. |
| 6,233,452 B1 | 5/2001 | Nishino |
| 6,259,405 B1 | 7/2001 | Stewart et al. |
| 6,285,665 B1 | 9/2001 | Chuah et al. |
| 6,298,234 B1 | 10/2001 | Brunner |
| 6,326,918 B1 | 12/2001 | Stewart |
| 6,327,254 B1 | 12/2001 | Chuah |
| 6,359,880 B1 | 3/2002 | Curry et al. |
| 6,363,421 B2 | 3/2002 | Barker et al. |
| 6,366,561 B1 | 4/2002 | Bender |
| 6,377,548 B1 | 4/2002 | Chuah et al. |
| 6,377,982 B1 | 4/2002 | Rai et al. |
| 6,393,482 B1 | 5/2002 | Rai et al. |
| 6,400,722 B1 | 6/2002 | Chuah et al. |
| 6,414,635 B1 | 7/2002 | Stewart et al. |
| 6,414,950 B1 | 7/2002 | Rai et al. |
| 6,421,714 B1 | 7/2002 | Rai et al. |
| 6,430,276 B1 | 8/2002 | Bouvier et al. |
| 6,449,272 B1 | 9/2002 | Chuah et al. |
| 6,452,498 B2 | 9/2002 | Stewart |
| 6,463,055 B1 | 10/2002 | Lupien et al. |
| 6,490,291 B1 | 12/2002 | Lee et al. |
| 6,496,491 B2 | 12/2002 | Chuah et al. |
| 6,512,754 B2 | 1/2003 | Feder et al. |
| 6,519,252 B2 | 2/2003 | Sallberg |
| 6,519,458 B2 | 2/2003 | Oh et al. |
| 6,567,416 B1 | 5/2003 | Chuah |
| 6,577,643 B1 | 6/2003 | Rai et al. |
| 6,577,644 B1 | 6/2003 | Chuah et al. |
| 6,625,451 B1 | 9/2003 | La Medica et al. |
| 6,628,627 B1 | 9/2003 | Zendle et al. |
| 6,654,610 B1 | 11/2003 | Chen et al. |
| 6,665,718 B1 | 12/2003 | Chuah et al. |
| 6,675,208 B1 | 1/2004 | Rai et al. |
| 6,693,878 B1 | 2/2004 | Daruwalla et al. |
| 6,697,018 B2 | 2/2004 | Stewart |
| 6,704,311 B1 | 3/2004 | Chuah et al. |
| 6,732,176 B1 | 5/2004 | Stewart et al. |
| 6,745,234 B1 | 6/2004 | Philyaw et al. |
| 6,759,960 B2 | 7/2004 | Stewart |
| 6,801,509 B1 | 10/2004 | Chuah et al. |
| 6,847,620 B1 * | 1/2005 | Meier ............................ 370/328 |
| 6,892,201 B2 | 5/2005 | Brown et al. |
| 6,937,574 B1 | 8/2005 | Delaney et al. |
| 6,961,555 B1 | 11/2005 | Philyaw et al. |
| 6,973,574 B2 | 12/2005 | Mihcak et al. |
| 7,082,114 B1 | 7/2006 | Engwer et al. |
| 2002/0019875 A1 | 2/2002 | Garrett et al. |
| 2002/0046090 A1 | 4/2002 | Stewart |
| 2002/0089958 A1 | 7/2002 | Feder et al. |
| 2002/0187779 A1 | 12/2002 | Freeny |
| 2003/0112820 A1 | 6/2003 | Beach |
| 2004/0142658 A1 | 7/2004 | McKenna et al. |
| 2004/0164898 A1 | 8/2004 | Stewart |
| 2004/0186902 A1 | 9/2004 | Stewart |
| 2005/0261970 A1 * | 11/2005 | Vucina et al. .................... 705/16 |

FOREIGN PATENT DOCUMENTS

| | | |
|---|---|---|
| EP | 0 915 590 | 5/1999 |
| EP | 0 917 320 | 5/1999 |
| EP | 917 320 | 5/1999 |
| EP | 0 924 914 | 6/1999 |
| WO | 99/16263 | 4/1999 |
| WO | 00/41819 | 7/2000 |
| WO | WO 00/76249 | 12/2000 |

OTHER PUBLICATIONS

MobileStar Network, "MobileStar Network First to Provide Business Travelers with High-Speed Data Access Via the Internet—Wirelessly," New York, NY; Jun. 24, 1998.

Kuo W.K. et al. "Time Bounded Services and Mobility Management in IEEE 802.11 Wireless LANs" Personal Wireless Communications, Dec. 17, 1997, pp. 157-161.

M. Mouly, B. Pautet "The GSM System for Mobile Communications" 1992, XP002206125, pp. 446-459.

International Search Report, Application No. PCT/US 02/01867, mailed Aug. 19, 2002.

"High-Performance Wireless Access Point for the Enterprise", ORiNOCO™ AP-100 Access Point for the Enterprise, Lucent Technologies, 2000.

"ORiNOCO AP-10000—Getting Started", Lucent Technologies.

"ORiNOCO Manager Suite User's Guide", Lucent Technologies, Nov. 2000.

"IEEE Standards for Local and Metropolitan Area Networks: Virtual Bridged Local Area Networks", IEEE Std 802. 1Q-1998, Dec. 8, 1998.

U.S. Appl. No. 10/198,038 by O'Hara et al., Jul. 17, 2002.

* cited by examiner

| WSP Identification information 1 | Wireless Service provider 1 | Wired Transport Medium Information 1 Access level 1 |
| --- | --- | --- |
| WSP Identification information 2 | Wireless Service provider 2 | Wired Transport Medium Information 2 Access level 2 |
| WSP Identification information 3 | Wireless Service provider 3 | Wired Transport Medium Information 3 Access level 3 |
| WSP Identification information 4 | Wireless Service provider 4 | Wired Transport Medium Information 4 Access level 4 |
| WSP Identification information 5 | Wireless Service provider 5 | Wired Transport Medium Information 5 Access level 5 |

Fig. 5

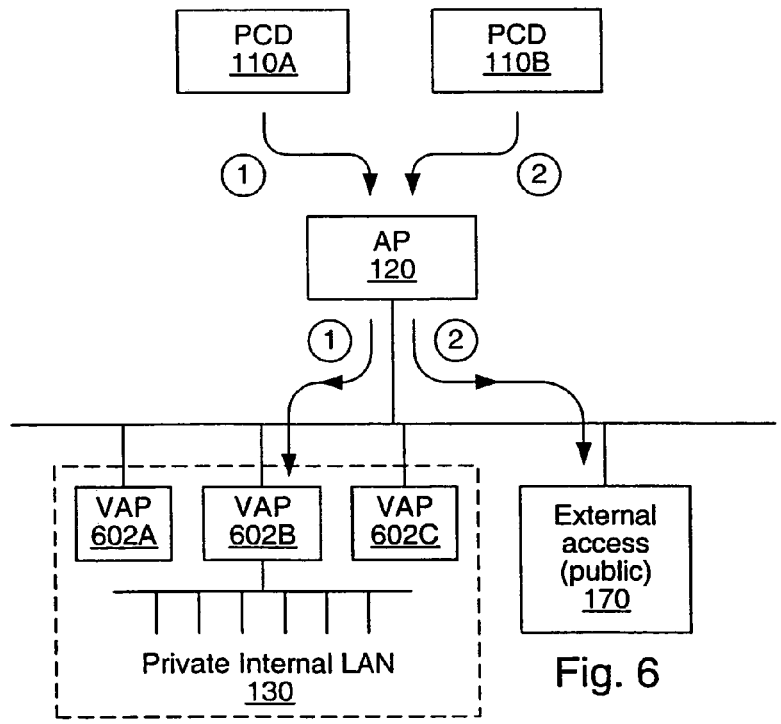

Fig. 6

SYSTEM AND METHOD FOR CONCURRENTLY UTILIZING MULTIPLE SYSTEM IDENTIFIERS

RELATED APPLICATION

This application is a continuation of U.S. application Ser. No. 10/848,897 filed May 19, 2004 now U.S. Pat. No. 7,701,912 and entitled "System and Method for Concurrently Utilizing Multiple System Identifiers" which is a divisional of U.S. application Ser. No. 09/767,374 filed Jan. 22, 2001 and entitled "System and Method for Concurrently Utilizing Multiple System Identifiers" which is a continuation-in-part of U.S. application Ser. No. 09/551,291 filed Apr. 18, 2000 entitled "Distributed Network Communication System Which Enables Multiple Network Providers to Use a Common Distributed Network Infrastructure, now U.S. Pat. No. 6,732,176.

BACKGROUND

1. Field of the Invention

This invention relates generally to wireless network communications, and more specifically to a system and method enabling a network infrastructure to support multiple wireless service providers and/or customers of multiple wireless service providers. The invention also relates to a system and method enabling different access levels within a wired or wireless network system.

2. Description of the Relevant Art

Various types of wired and wireless infrastructures are being developed to service users of computing devices, such as portable computing devices (PCDs). Currently, numerous wireless service providers are attempting to install wireless network infrastructures in various locations, such as airports, hotels, office buildings, shopping malls, etc. for use by various users, such as mobile users (MUs) of PCDs.

However, when two or more providers install a wireless network infrastructure in a single location, such as an airport, the providers begin to oversubscribe the RF domain. In other words, the electromagnetic spectrum usable by these wireless networks is limited, and if two or more wireless networks are installed in the same location, this may result in inadequate RF bandwidth for use by each of these networks.

IEEE 802.11 defines the IEEE standard for wireless Ethernet. IEEE 802.11 is designed to support multiple overlapping wireless local area networks (LANs) in a given coverage area. Each wireless local area network will typically include one or more access points (APs) which communicate in a wireless fashion with a corresponding computing device of a user, which typically includes a wireless Ethernet transceiver. IEEE 802.11 currently uses a System ID (SID) to "select" which LAN to use and the access point with which to associate.

Currently, only 3 non-overlapping RF channels are available for different wireless service providers. Once these channels are used, no further bandwidth, or limited bandwidth, may be available for other providers.

In the U.S. and most of Europe, only 3 non-overlapping channels are available using 802.11 Direct Spread (802.11 DS) (Direct Sequence Spread Spectrum) radios. In other geographies, such as France and Japan, only one channel is available using 802.11 DS. When using Frequency Hopping radios, only one "channel" is defined. The use of different "spreading codes" in conjunction with FH radios only obfuscates the cointerference. Once the available channels are used, perhaps one by each provider of a wireless infrastructure, no further bandwidth is available for other providers without the potential for harmful co-interference and the resultant reduction in available bandwidth.

Thus, due to the problems associated with multiple wireless infrastructures installed in a common area, it is desirable to provide a single wireless infrastructure which may be used by two or more wireless service providers (WSPs). This would allow a plurality of WSPs to utilize a common set of access points (APs) to provide service to a potentially overlapping set of customers or subscribers. It may also be desirable to provide a wireless infrastructure which can selectively provide different access levels to users of the system.

In the installation of a common-use wireless system, there are commonly two approaches to providing service to each WSP's subscribers, wherein each approach uses a common authentication I accounting system. A common authentication I accounting system involves "tying together" the authentication 1 accounting systems of each provider, thereby forming a "roaming consortium". The first approach is called RADIUS (Remote Authentication Dial in User Service), and the second approach is called TACACS+. Typically these consortiums use the RADIUS as a common authentication and accounting protocol. RADIUS is a protocol defined by the IETF RADIUS Working Group for carrying information between network access devices and security/accounting servers, and is documented in RFCs 2138 and 2139. TACACS+, a similar protocol developed by Cisco Systems, is also used by some providers, although it suffers from security issues in common implementations.

The main advantage of tying the authentication/accounting systems together is the relative ease of doing so. Indeed, RADIUS was designed to support a tiered hierarchy of services providers. However, this seeming ease of implementation hides other issues which remain unsolved via this approach. Most of these center around the fact that RADIUS and TACACS+ were designed to support connectivity via a dial-up network (using either modems or ISDN). Indeed, the very acronym "RADIUS" references this dial-up heritage and focus. Since Wireless LANs are not "dial-up" by their very nature, several assumptions which are "built-in' 'to the RADIUS and TACACS+ protocols have the potential to limit the type and number of services deployed over wireless LANs.

RADIUS has its share of security issues as well. The RADIUS protocol is open to a possible dictionary attack on "shared secret" passwords. Discovery of these can be used to spoof "Access-Accept" packets, with the result of "free service" being granted to the attacker, While this security hole is only possible if the attacker is able to "sniff" communications between the RADIUS server and client, wireless networks make this type of unauthorized access even more likely.

However, the most glaring issue associated with using a common authentication 1 accounting system is that any approach that ties the authentication and accounting systems of a set of WSPs together does nothing to solve problems related to "ESSIDs", described below.

As noted above, the IEEE 802.11 specification is a wireless LAN standard developed by the IEEE (Institute of Electrical and Electronic Engineering) committee in order to specify an "over the air" interface between a wireless client and a base station or Access Point, as well as among wireless clients. First conceived in 1990, the standard has evolved from various Draft versions (Drafts 1 through 6), with approval of the final draft on Jun. 26, 1997.

The 802.11 MAC layer, supported by an underlying PHY layer, is concerned primarily with rules for accessing the wireless medium. Two network architectures are defined: the Infrastructure Network and the Ad Hoc Network. The Infrastructure Network is a network architecture for providing communication between wireless clients and wired network resources. The transmission of data from the wireless to the wired medium is via an Access Point (AP). The coverage area is defined by an AP and its associated wireless clients, and together all the devices form a Basic Service Set (BSS).

The IEEE 802.11 protocol also defines an ESSID (Extended Service Set ED) that is essentially a network name. The ESSID is used to select an associated wireless LAN infrastructure. Two or more BSSs configured with the same ESSID attached to a common distribution system (for instance, an Ethernet LAN) forth an ESS (Extended Service Set.)

With multiple access points, clients (PCDs) are free to move seamlessly between access points, as long as the ESSID matches. This feature is built into the 802.11 specification. When a client (PCD) starts losing the signal with its associated access point, it begins to search the area for a closer access point. Once a new access point is found, the client initiates an association with the new access point and a disassociation from the old one.

In public-access networks the ESSID has been commonly used to choose the WSP infrastructure with which to associate. However, this creates a problem: Each AP can only support one ESS and one associated ESSID. Thus, in order for multiple service providers to share a common space, N sets of APs are needed, where N is the number of service providers. This leads to co-interference, over-subscription of the RF environment and resultant lack of available bandwidth, as described above.

The commonly suggested solution to this problem is that all WSPs who wish to allow roaming agree on a common ESSID for their wireless networks. While initially this may appear to solve the problem, it also requires not only a common authentication system, but also a common network infrastructure which connects to the Internet and other services. The issues with a common authentication system have been outlined above. There are also numerous issues associated with using a common ESSID to support multiple WSPs in a common network infrastructure.

First, a common network infrastructure with a shared ESSID would result in insufficient network security. Since all devices would necessarily be associated with the same network infrastructure, all manner of attacks, both active (such as Denial of Service) and passive (e.g. snooping or sniffing) would be possible.

Second, to rely on coordination of ESSIDs among a potentially large number of WSPs seems questionable at best. As new providers enter the market, each must choose to configure its APs such that roaming by other providers' subscribers is permitted. In fact, the case can be made that every WSP who chooses to participate in any roaming network would need to configure ALL of its APs to support this as yet undefined ESSID.

Even if these steps are taken, once every WSP has chosen to use the same ESSID, a new problem occurs. Unless roaming agreements are global, and every provider agrees to allow each other provider to roam on its APs, the user of any given service cannot know that his/her WSP(s) provide service in any given area. The user of such a service is left to "guess" at service availability.

Further, global coordination around a single ESSID (combined with a common authentication system) does not solve the problem. An increasing number of enterprises (large and small) are installing 802.11-compliant network infrastructures, and equipping the employees of these companies with wireless Network Interface Cards (NICs). Each of these enterprises will likely define its own ESSID, and possibly an associated WEP (Wired Equivalent Privacy) key. Further still, inexpensive 802.11-compliant APs are now available for the home market (witness the Apple Airport), and these wireless networks will likely have their own ESSIDs.

Thus, even if all WSPs select and co-ordinate on a single ESSID, enterprises (including airlines) and other users of 802.11-compliant IVICs will need to reconfigure their equipment in order to use any common-ESSID network provided by these WSPs. This would likely be too inconvenient for most users.

Finally, given a common infrastructure, only one broadcast domain is possible. For an IP-based network (such as must be supplied to provide connectivity to the Internet), this implies that only one IP address space (and by extension, one Dynamic Host Configuration Protocol (DHCP) server) is possible for each location. This implies that the WSP who owns the infrastructure (and supplies the connectivity) in each location has an advantage in that the network connectivity for that WSP's customers will experience better connectivity. Also implied is that any resource located on the network (such as file or video servers, voice gateways, and otherwise secured facilities of other airport tenants) is available to all users of the wireless infrastructure, and thus no service differentiation is possible.

Therefore, it would be desirable to provide a system and method which enables a common wireless network infrastructure (and especially an IEEE 802.11 wireless network infrastructure) to be used by two or more wireless service providers (WSPs). This would allow a plurality of service providers to utilize a common set of access points to provide service to a potentially overlapping set of customers. This would also provide subscribers or users with the ability to more fully utilize the existing network infrastructure. It would further be desirable to provide a distributed wireless network system which can selectively provide different access levels to users of the system.

SUMMARY OF THE INVENTION

One embodiment of the present invention comprises a system and method for enabling multiple wireless service providers (WSPs) to use or provide services on a common wireless network infrastructure. The system and method can thus provide access and/or roaming features on a distributed wireless network system.

The network system includes a plurality of access points (APs) coupled to a network. The network access points include wireless access points, and may also include wired access points. Access points for the network may be widely distributed in various facilities, such as airports, mass-transit stations, hotels, and various businesses, such as business offices, restaurants, and stores. The network may couple to a wide area network, such as the Internet. A plurality of wireless service providers (WSPs) or network providers may provide network services, such as Internet access, over the network infrastructure.

In one embodiment, a user, also referred to as a subscriber, may access the network system through a portable computing device (PCD) using, for example, a wireless network interface card (NIC). When in sufficiently close range to an access point, the PCD may wirelessly communicate with the AP in the network system. In one embodiment, the APs are arranged at known geographic locations and may provide geographic location information regarding the geographic location of the AP or the mobile user.

Each PCD may store identification information which may uniquely indicate at least one wireless service provider of a plurality of possible wireless service providers. The identification information thus may designate the wireless service provider (or providers) to which the user of the PCD is a subscriber. The identification information may take various forms, such as a System ID (SID), MAC ID, or other identification which may be used to identify the wireless service provider to which the user has subscribed. As used herein, the SID may comprise an SSID (Service Set ID) or an ESSID (Extended Service Set ID). When the PCD becomes close to an access point, the PCD may provide the identification information to the access point.

In one embodiment, each of the access points is operable to "listen for" or detect identification information, e.g., System IDs, associated with numerous different providers, contained in "probes" broadcast by PCDs. Alternatively, each of the access points may be operable to broadcast requests for identification information, e.g., broadcast recognized System IDs to the PCDs, wherein the PCDs may respond to this broadcast by providing the identification information. Such broadcasts by APs are known as "beacons".

When an access point receives the identification information from a PCD of a user, the access point may determine the appropriate wireless service provider for the portable computing device using the identification information. Thus, the network system is able to recognize and process identification information which identifies any of the plurality of possible wireless service providers. In one embodiment, the APs answer all queries from all PCDs, even if the identification information from the PCD does not match the information available to that particular AP, e.g., even if an unknown SID is received.

In one embodiment, the network system may include a memory medium which stores a list of identification information that maps to a corresponding list of the plurality of possible wireless service providers. The memory medium may be comprised in one or more of, or all of, the access points, or may be comprised in one or more other devices connected to the network, such as a computer system. In this embodiment, determining. the wireless service provider for the portable computing device includes accessing the memory medium and using the received identification information to determine the wireless service provider. For example, the access point or other device may use the received System ID to index into a table to determine the appropriate WSP.

The memory medium may also store associated access information. For each of the wireless service providers, the access information may include access methods for providing user data to the respective wireless service provider, such as a destination IP address of the WSP. The appropriate access method may be used based on the identification information and/or the determined WSP. Thus, the identification information may be used to determine the appropriate WSP as well as to automatically route network packets or data between that PCD and the appropriate provider.

The access information stored in the memory medium may also include an access level which indicates the user's access rights or privilege level. Thus, the local network or the WSP may provide various local resources which are available to all users regardless of access level, and users with a higher access level may additionally be entitled to Internet access. In other environments, all users may receive Internet access, and users with a lower access level may not be entitled to view or utilize certain or all local network resources on the network. Thus, depending on the access level, the user may be provided solely with external Internet access, or only local network access, or may be provided with no network services. The access level may also possibly depend on the known geographic location of the AP or the user. For example, the access level for each user may vary depending on the known geographic location of the AP to which the user is currently associated, or may depend on the approximate geographic location of the user, e.g., may depend on whether the user is in a certain store or in a secure area.

In one embodiment, one or more of the wireless service provider ID and the access information may be provided by the PCD of the user. Thus, an access point or other device on the network may not be required to perform a look-up to determine this information, but rather this information may be provided by the PCD.

When the portable computing device communicates with the access point, the network access may be provided to the portable computing device through the determined WSP. For example, the access point may provide the communicated data to a destination based on or specified by the determined WSP, e.g., may provide or route the data to the determined wireless service provider's site, e.g., to equipment provided by the WSP. The WSP may then provide Internet access and/or other network services. The WSP will also typically charge a fee for this service. The access point preferably provides the data to the destination in a secure manner to prevent the data from being unintentionally provided to third parties, such as other providers.

Thus the wireless network system is useable by subscribers of each of the plurality of possible wireless service providers, thereby enabling subscribers to "roam" on various networks, including networks maintained by other providers. For example, the plurality of access points may be maintained by a first WSP, and a subscriber of a second WSP may be recognized and allowed use of the network. Alternatively, the plurality of access points may be maintained by an independent third party, and subscribers of any of various WSPs may be recognized and allowed use of the network. Wireless service providers may charge subscribers for access regardless of who operates or maintains the network. In addition, the network system may selectively provide users different access levels to network resources depending on the access or privilege level of the user. This allows WSPs to offer different levels of access to customers, possibly based on different service fee levels. This also allows visitors or non-members of a network system to be allowed certain network services, such as Internet access, without compromising other private network resources.

In one embodiment, the system includes at least one AP with software which is executable to provide access point functionality for each of a plurality of WSPs. The software may implement a "super access point" which maintains associations between the plurality of WSPs and a corresponding plurality of SIDS, such as MAC IDs, ESSIDs, etc. The AP may be capable of broadcasting or recognizing any of the plurality of SIDS, behaving appropriately for different SIDS that are received from PCDs of users, and providing network services to each user through that user's corresponding WSP. Thus an AP may be operable to appear as any one of a plurality of different WSP APs, meaning that a single AP may "pretend to be" or behave as an access point dedicated to a particular WSP for each of a plurality of different WSPs.

In one embodiment, the system provides a plurality of virtual APs, where a virtual AP may comprise access point functionality implemented in software that appears as a physical AP to a PCD. The plurality of virtual APs or "software" APs may be implemented on one or more physical APs, e.g., on a common set of physical APs. For example, each physical AP may implement a plurality of virtual APs. Each instance of a virtual AP executes a complete 802.11 protocol stack, and may be indistinguishable from a hardware AP to any wireless network client(s). Each virtual AP or "software" AP may include its own ESSID and may be uniquely associated with a corresponding WSP. Thus, each WSP that uses a virtual AP solution would enjoy the illusion that there was a complete wireless infrastructure available for its exclusive use. In one embodiment, the System ID of each virtual AP may be a variant of the SID of the physical AP hosting the virtual APs.

Each of the APs may connect to a "wired" LAN. In one embodiment, the "wired" LAN supports a VLAN (Virtual LAN) protocol. In order to partition the network, the network system may maintain a binding between the ESSID and IEEE 802.1(q) VLAN tags or their equivalent. This allows a common wired backbone (using VLAN-capable Ethernet switches) to supply a secured "virtual LAN" to each WSP. In order to provide service differentiation and quality of service (QoS) to each user of the network, the network system may further enable 802.1(p) in these tags. This allows the proprietor of the network system to provide service level agreements to its customers, including both other WSPs and, for example, airport tenants. The network architecture described herein can scale to support hundreds of these network customers, and thousands of simultaneous users in each location.

In order to support users who arrive at the wireless network location (e.g., an airport) with an ESSID that does not match the ESSID of any WSP, the network system also allows for a "default" mapping. Users who arrive with a different ESSID, e.g., the ESSID used at their home or enterprise, would have their network data passed to a default or selected provider. This provider may present the user with the opportunity to use the network on a one-time basis, or may present the user with the opportunity to register with the provider, perhaps by requesting credit card information from the user.

The wireless network system described herein enjoys several advantages over the approach of tying the authentication system of each subscriber to a roaming "clearing house". The wireless network system described herein leverages the 802.11 protocol, and is agnostic as to which PHY technology is used. The present system can support all of the following 802.11 technologies:

802.11 FH (Frequency Hopping Spread Spectrum @ 1-2 Mbps in 2.4 Ghz)
  802.11 DS (Direct Sequencing Spread Spectrum @ 1-2 Mbps in 2.4 Ghz)
  802.11(b) (High-rate (I 1 Mbps) DSSS in 2.4 Ghz)
  802.11(a) (High-rate (50 Mbps) FHSS in 5.7 Ghz)
  Bluetooth (FHSS @<1 Mbps in 2.4 Gbz) (via similar virtualization of the SDP)

In one embodiment, the physical AP may comprise two radios, one Direct Spread Coding radio, and one Frequency Hopping radio, thus providing multiple PHY layers on one physical AP. Using the present system, one set of APs (for a given PHY technology) can maximize the coverage in a given space with a minimum of cc-interference. A group of providers can share this "footprint", enabling maximum coverage for the superset of the subscribers to each service. Each wireless service provider can leverage their expertise in attracting members and providing value-added services or content.

In addition, each location authority, (e.g., an airport authority) can deal with one "master concession", who is responsible for building and maintaining the RF infrastructure, manages the RF environment, and sub-leases this infrastructure to the other providers. In fact, the location authority can act as the "master concession", should it so desire.

The present system is also transparent to authentication technology used by any provider. Due to the issues raised above, the wireless subscriber technology described herein is not based on RADIUS or TACACS+. Instead, the present subscriber technology may use a "single sign-on" technology based on X.509 certificates. Similar technology is used to secure nearly every WWW transaction that requires protection.

The present system is also transparent to the network protocols in-use. While other provider's approaches assume that IPv4 is the only protocol in-use, the present system allows other protocols (IPX, IM, NetBIOS, ARP, etc) to be used in the network as they normally would, with the singular exception that these flows take place within the virtual LAN provided by the APs and the network backbone.

Thus the wireless network system described herein enables a common infrastructure to be used by a plurality of wireless service providers, and provides a number of advantages over the prior art.

BRIEF DESCRIPTION OF THE DRAWINGS

Other objects and advantages of the invention will become apparent upon reading the following detailed description and upon reference to the accompanying drawings in which:

FIG. 5 illustrates an example of a data structure which stores wireless service provider and access information;

FIG. 6 illustrates selectively allowing access to a wireless network system using various access levels;

Figure 1:
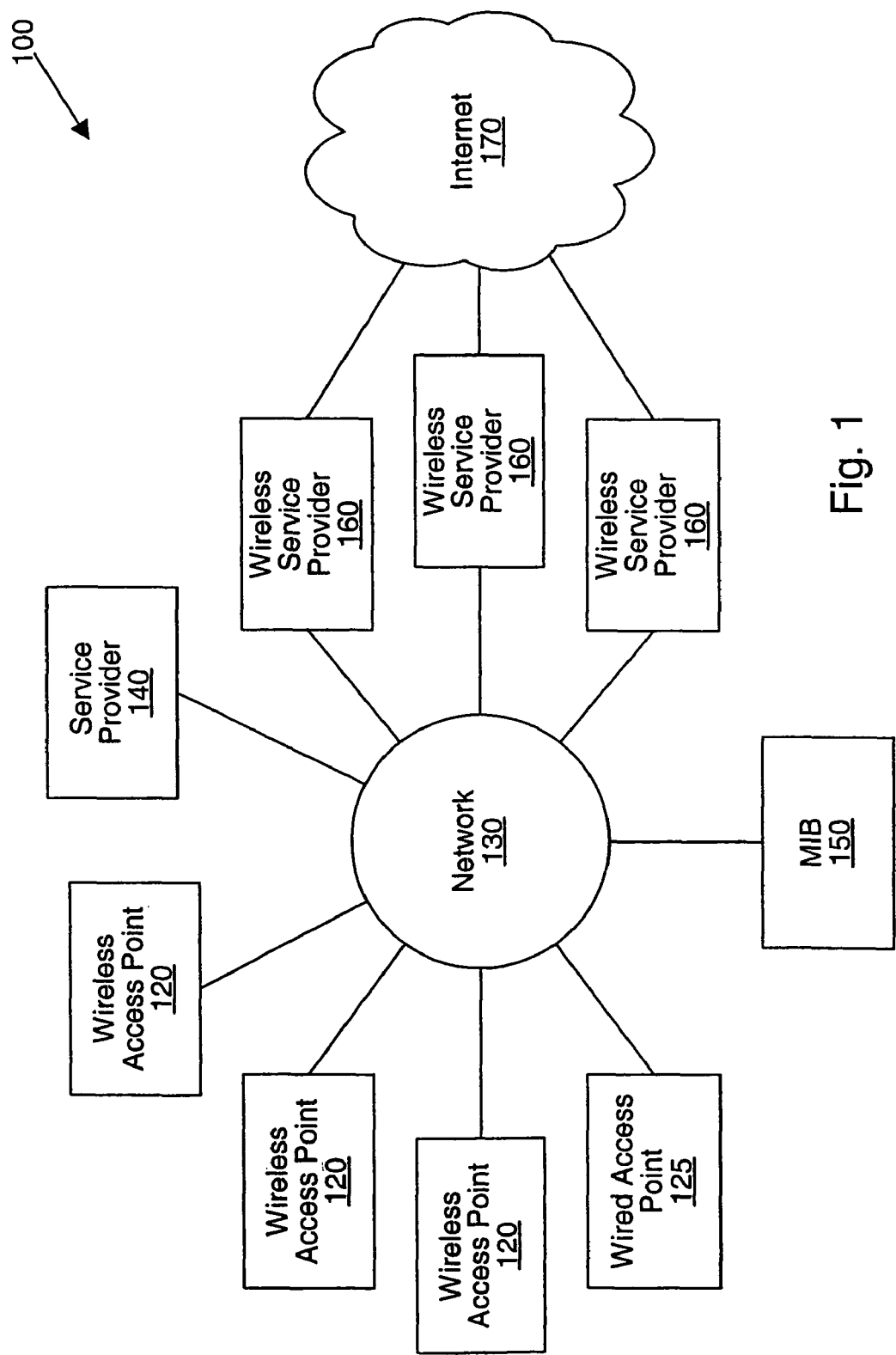
FIG. 1 is a block diagram of one embodiment of a wireless network system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

EMBODIMENTS

Incorporation by Reference

U.S. patent application Ser. No. 09/551,291 titled "A Distributed Network Communication System which Enables Multiple Network Providers to Use a Common Distributed Network Infrastructure" and fled on Apr. 18, 2000, whose inventors are Brett B. Stewart, James W. Thompson and Kathleen E. McClelland is hereby incorporated by reference in its entirety as though fully and completely set forth herein.

U.S. Pat. No. 5,835,061 titled "Method and Apparatus for Geographic-Based Communications Service", whose inventor is Brett B. Stewart, is hereby incorporated by reference in its entirety as though fully and completely set forth herein.

U.S. Pat. No. 5,969,678 titled "System for Hybrid Wired and Wireless Geographic-Based Communications Service", whose inventor is Brett B. Stewart, is hereby incorporated by reference in its entirety as though fully and completely set forth herein.

U.S. patent application Ser. No. 09/433,817 titled "Geographic Based Communications Service" and filed on Nov. 3, 1999, whose inventors are Brett B. Stewart and James Thompson, is hereby incorporated by reference in its entirety as though fully and completely set forth herein.

U.S. patent application Ser. No. 09/433,818 titled "A Network Communications Service with an Improved Subscriber Model Using Digital Certificates" and filed on Nov. 3, 1999, whose inventors are Brett B. Stewart and James Thompson, is hereby incorporated by reference in its entirety as though fully and completely set forth herein.

U.S. patent application Ser. No. 09/551,309 titled "System and Method for Managing User Demographic Information Using Digital Certificates" and filed on Apr. 18, 2000, whose inventors are Brett B. Stewart and James Thompson, is hereby incorporated by reference in its entirety as though fully and completely set forth herein.

FIG. 1—Network Communication System

FIG. 1 shows one embodiment of a distributed network communication system 100. The network system 100 may include one or more access points 120, preferably a plurality of access points 120. At least a subset of the access points 120 are wireless access points (APs) 120 which communicate with a portable computing device (PCD) 110 in a wireless fashion. Each wireless access point (AP) 120 may have a wireless connection or transceiver (e.g., an antenna) and may operate according to various wireless standards, such as wireless Ethernet (IEEE 802.11), Bluetooth, etc. One or more of the access points 120 may also be wired access points which communicate with a portable computing device 110 in a wired fashion.

Each AP 120 may be coupled to a network 130. The network 130 may comprise a wired network, a wireless network or a combination of wired and wireless networks. For example, the network 130 may be a standard "wired" Ethernet network which connects each of the wireless (and wired) access points 120 together. The network 130 may also be a wireless network based on IEEE 802.11. The network 130 may form part of the Internet, 170, or may couple to other networks, e.g., other local or wide area networks, such as the Internet 170.

The network 130 may also include or be coupled to other types of communications networks, (e.g., networks other than those comprised in the Internet) such as the public switched telephone network (PSTN), whereby a user using PCD 110 may send and receive information from/to the PSTN or other communication network through a wireless service provider. The network 130 may also include, or be coupled to, another wide area network 130, such as a proprietary WAN. The network 130 thus may be, or be coupled to, any of various wide area networks (WANs) or local area networks (WANs), including the Internet 170.

The access points (APs) 120 may be widely distributed in various facilities, such as airports, mass-transit stations, hotels, shopping malls, restaurants and other businesses, such as business offices, law firm offices, retail stores, etc. For example, where the access points 120 are distributed in an airport, one or more access points 120 may be distributed throughout various terminals in the airport, in an airline club, and in coffee shops, restaurants or rental car counters at the respective airport. The access points 120 may thus be primarily designed to service mobile users, wherein it may not be known ahead of time which mobile users will be accessing the network from which locations. Thus the network system 100 is preferably a distributed network system, with access points placed in locations to service mobile users. This differs from a conventional fixed LAN, where it is generally pre-configured as to which pre-determined users will be using which nodes in the fixed LAN on a day-to-day basis, and the relative access levels that these pre-determined users have is also pre-configured.

Each access point 120 may comprise information used to identify or select a wireless service provider (also called a network provider) for a particular user, as well as related access information to enable the wireless service provider to provide access. Each access point 120 may comprise information used to enable network access through a wireless service provider of a plurality of possible wireless service providers. Thus each access point 120 may support a plurality of different wireless service providers. When in sufficiently close range to an access point 120, or when the PCD 110 is directly coupled to an access point 120 in a wired fashion, the PCD 110 may access the network utilizing a particular wireless service provider, as discussed further below.

A user operating a portable computing device (PCD) 110 may communicate with one of the access points 120 to gain access to network services, such as Internet access. The portable computing device (PCD) 110 may have a wireless communication device, e.g., a wireless Ethernet card, Bluetooth wireless interface, etc., for communicating with a wireless access point 120. The portable computing device (PCD) 110 may instead have a wired communication device, e.g., an Ethernet card, for communicating with a wired access point 125.

The portable computing device 110 may be any of various types of devices, including a computer system, such as a portable computer, a personal digital assistant (PDA), an Internet appliance, a communications device or telephony device, or other wired or wireless device. The PCD may include various wireless or wired communication devices, such as a wireless Ethernet (IEEE 802.11) card, Bluetooth logic, paging logic, RF communication logic (such as cellular phone logic), a wired Ethernet card, a modem, a DSL device, an ISDN device, an ATM device, a parallel or serial port bus interface, or other type of communication device.

The PCD 110 preferably includes a memory medium which stores identification information indicating a wireless service provider to which the user has subscribed. The indicated wireless service provider may be one of a plurality of possible wireless service providers that provide Internet access or other network services in a network system such as that shown in FIG. 1. The identification information may be a System ID (an 802.11 System ID), a MAC ID of a wireless Ethernet device comprised in the PCD 110, the name of the wireless service provider, or other type of information that uniquely identifies one (or more) wireless service providers. Where the wireless network is IEEE 802.11 wireless Ethernet, the identification information or System ID may be a SSID (Service Set ID), an ESSID (Extended Service Set ID) or possibly a BSSID (Basic Service Set ID). Where the wireless network is Bluetooth, the identification information may be an IP address. The identification information may be contained in a digital certificate, which may be stored in a web browser or other location of the personal computing device 110.

Where the access point 120 is a wireless access point 120, the wireless communication may be accomplished in a number of ways. In one embodiment, PCD 110 and wireless AP 120 are both equipped with an appropriate transmitter and receiver compatible in power and frequency range (e.g., 2.4 GHz) to establish a wireless communication link. Wireless communication may also be accomplished through cellular, digital, or infrared communication technologies, among others. To provide user identification and/or ensure security, the PCD 110 may use any of various security mechanisms, such as WEP (Wired Equivalent Privacy).

Where the access point 120 is a wired access point 120, the wired connection may be accomplished through a variety of different ports, connectors, and transmission mediums. For example, the PCD 110 may be connected through an Ethernet, USB, serial, or parallel transmission cables, among others. The PCD 110 may also include various communication devices for connecting to the AP 120, such as wired Ethernet cards, modems, DSL adapters, ATM adapters, IDSN devices, or other communication devices. For example, a hotel may have Ethernet connections in the restaurants, shops, and guest rooms. An airline club, e.g., an airport Admiral's Club, may also have both wireless and wired connections for mobile users. A user may connect to a wired access point 120 through the use of a laptop computer (PCD 110), an Ethernet network card, and a network cable. This connection may have the same impact as a connection made to a wireless AP 120 as discussed above. In other words, a user using a wired PCD 110 is able to "roam" on various network infrastructures in the same manner as a user using a wireless PCD 110.

One or more wireless service providers may each have an associated network device 160 coupled to the network 130. For example, FIG. 1 illustrates network devices 160 associated with three different wireless service providers. The network devices 160 may take any of various forms, such as a computer system, router, bridge, etc. It is noted that wireless service providers may provide network services at a network location without being required to locate any equipment or bandwidth at a the network location. For example, a wireless service provider may combine VLANs and IP tunneling to avoid having to locate any equipment or bandwidth at a particular network location.

A user operating a portable computing device 110 will typically have previously subscribed with one (or more) Wireless Service Providers (WSPs), also called network providers. Examples of wireless service providers include Wayport, MobileStar and Softnet, among others. As discussed further below, when the PCD 110 of a user communicates with an AP 120, the respective wireless service provider to which the user is subscribed is determined. If no previous affiliation with a wireless service provider is detected, a default wireless service provider may be selected. After the wireless service provider is determined or selected, network access or services may be provided through that wireless service provider. For example, data or packets from the respective PCD 110 may be routed to a destination designated by the respective wireless service provider, such as the respective provider's network device 160. This effectively allows a plurality of wireless service providers to each offer access on a common network infrastructure, i.e., on common access points. Thus a single access point can support multiple different wireless service providers, i.e., can support subscribers of multiple different wireless service providers. This also allows subscribers of various wireless service providers to "roam" on other networks, such as networks installed and/or maintained by other providers, or networks maintained by independent third parties.

The network system 100 may also include a management information base (MIB) 150. The MIB 150 may be a mechanism, such as a memory, which may allow the persistent storage and management of information needed by network 130 to operate. For example, in one embodiment of the invention, the MIB 150 may store a data structure, such as a table comprising a list of identification information and a corresponding list of the plurality of possible wireless service providers. The data structure may also store access information, which may comprise associated methods for providing data to the respective plurality of possible wireless service providers. The access information may further comprise access level or privilege level information. Thus, the data structure may comprise a table having a plurality of tuples, with each tuple having the identification information, e.g., a System ID, the corresponding wireless service provider, and access information containing a method of access to the provider, possibly including a destination IP address or other methodology for accessing the provider's site. In an alternate embodiment, as noted above, the data structures which store this information may be comprised in each of the access points 120, or may be provided in various other locations. Each tuple may further include wired transport information, such as a VLAN tag, Generalized Routing Encapsulation (GRE), or other wired transport information, indicating a channel to be used on the wired network to which the AP 120 is coupled.

As discussed further below, when a portable communication device 110 of a user begins communication with an access point 120, the portable communication device 110 may transmit wireless service provider II) information, and the wireless service provider for the portable computing device 110 may be determined using this data structure. The memory medium containing the data structure may be accessed, and received wireless service provider identification information from the respective portable computing device 110 may be used to index into the data structure or table to determine the wireless service provider. The appropriate access method may also be accessed and used for enabling the wireless service provider to provide network services, e.g., the access method may be used for providing the data from the respective portable computing device 110 to the determined wireless service provider. For example, wired transport information may also be used to determine how to transfer packets on the wired network. Access level information may also be retrieved and used to determine a user's access to local network resources or Internet access.

The MIB 150 may store other information, such as a directory of all the elements (e.g., APs, PCDs, etc) in the network, the topology of the network, characteristics of individual network elements, characteristics of connection links, performance and trend statistics, and any information which is of interest in the operation of the network 130. For example, the MIB may store the precise longitude, latitude, altitude and other geographic information pinpointing the location of each access point.

One or more service providers 140 may also be coupled to the network 130 or other networks to which the network 130 is coupled, such as the Internet 170. As used herein, the term "service provider" is intended to include various types of service and information providers which may be connected to the network 130. The service provider 140 may take any of various forms and may provide any of various services or information. Each service provider 140 may include one or more computers or computer systems configured to provide goods, information, and/or services as appropriate for the service provider. The one or more service providers 140 may couple to the network in a wired or wireless fashion. The service providers 140 may include "network access" providers which typically charge fees for network access. The service providers 140 may also include other types of providers which may provide a service at the location where the APs are located. For example, in an airport, example service providers may include an airline server or airline personnel (which may operate as clients of APs) which provides flight information and/or helps direct passengers to flights. In a hotel, example service providers may include housekeeping, engineering, and other typical hotel services which may utilize particular WSPs for their respective network services. For example, maid carts in a hotel may be configured with PCDs to answer requests from users that are staying in the hotel. Thus, the plurality of WSPs may include fee-based network access providers for serving customers, as well as operational service providers for serving the needs of employees.

The network communication system 100 may be geographic-based. In other words, the network communication system 100 may provide information and/or services to the user based at least partly on the known geographic location of the user, e.g., as indicated by the access points 120 or as indicated by geographic information (e.g., GPS information) provided from the PCD 110. In one embodiment, the APs 120 are arranged at known geographic locations and may provide geographic location information regarding the geographic location of the user or the PCD 110. In another embodiment, the PCD 110 may provide geographic location information of the PCD 110 through the AP 120 to the network 130. For example, the PCD 110 may include GPS (Global Positioning System) equipment to enable the PCD 110 to provide its geographic location through the AP 120 to the network 130, such as to a service provider 140 coupled to the network 130.

In one embodiment, the network communication system 100 may provide information and/or services to the user based on both the known geographic location of the user and an access level of the user. For example, a bank official may have an access level which allows access to security codes regarding electronic or physical access to funds. The access level may only be operational when the employee (or the employee's PCD) is in a secure area of the bank, thereby preventing unauthorized or unintended access to sensitive information, such as due to coercion or theft of the user's PCD.

Memory. Medium and Carrier Medium

One or more of the systems described above, such as PCD 110, access points 120, MIB 150, and wireless service providers 160 may include a memory medium on which computer programs or data according to the present invention may be stored. For example, each of the access points 120 and/or the MIB 150 may store a data structure as described above comprising information regarding identification information, corresponding wireless service providers 160 and access information such as associated data routing methods. Each of the access points 120 and/or the MIB 150 may further store a software program for accessing these data structures and using the information therein to properly provide or route data between users (subscribers) and their corresponding wireless service providers, or to selectively provide or route data depending on the access information.

One or more of the access points 120 and/or the NUB 150 may include software that enables the AP 120 to accommodate or service subscribers of a plurality of different WSPs. Thus an AP 120 may be operable to appear as any one of a plurality of different WSP APs, meaning that a single AP may "pretend to be" or behave as an access point dedicated to a particular WSP for each of a plurality of different WSPs. In contrast, prior art APs are only able to provide access point services for a single WSP. In other words, according to one embodiment of the invention, an AP 120 may execute one or more software programs that allow it to act as an AP for each of a plurality of WSPs. Thus, each AP 120 may be capable of broadcasting or recognizing any of a plurality of SIDS, and maintaining associations between the SIDS and the subscribers of the respective WSPs. The physical AP may further behave appropriately for different SIDS that are received from PCDs of users, providing network services to each user through that user's corresponding WSP.

In one embodiment, at least one of the APs 120 may include software that enables the single physical AP 120 to implement a plurality of virtual APs, where a virtual AP may comprise access point functionality implemented in software that appears as a physical AP to a PCD. The plurality of virtual APs or "software" APs may be implemented on one or more physical APs, e.g., on a common set of physical APs. Each instance of a virtual AP executes a complete 802.11 protocol stack, and is indistinguishable from a hardware AP to any wireless network client(s). Each virtual AP or "software" AP may include its own ESSID (e.g., an ESSID as specified in IEEE 802.11) and may be uniquely associated with a corresponding WSP. Thus, each WSP that uses a virtual AP solution would enjoy the illusion that there was a complete wireless infrastructure available for its exclusive use.

In another embodiment, at least one of the APs 120 may include software that enables the single physical AP 120 to behave appropriately for each of a plurality of WSPs. For example, instead of implementing a plurality of virtual APs, i.e., instead of storing and executing a plurality of virtual AP software program instantiations, a single software instantiation may enable this operation. In the embodiment above, each virtual AP may entail one or more software programs, and each instantiation of a virtual AP may utilize a separate instazatiation or replication of these one or more software programs. In this "super access point" embodiment, a single instantiation of one or more software programs may enable the physical AP 120 to behave appropriately for each of a plurality of WSPs. These one or more software programs may execute to cause the AP 120 to: broadcast and recognize a plurality of different SIDS corresponding to each of a plurality of different WSPs, maintain associations between SIDs and WSPs, maintain SID and VLAN tag mappings, and perform other operations necessary to enable the single physical AP 120 to behave appropriately for each of a plurality of WSPs.

In the virtual AP embodiment described above, as noted, for one or more of the access points 120, each physical access point 120 may include a plurality of virtual APs implemented in software that are comprised on the single physical access point 120. As described above, each of these virtual APs may be used for servicing a respective WSP, i.e., for providing network access services to a respective WSP. According to the current IEEE 802.11 standard, each physical AP has a BSSID (Basis Service Set ID). The BSSID is typically the MAC ID of the network interface device comprised in the physical AP 120.

However, when multiple virtual APs are comprised on or implemented on a single physical AP, it may not be possible to use the same MAC ID of the physical AP as the BSSID of each of the virtual APs on that physical AP. In other words, using this approach, each of the virtual APs may not receive a unique BSSID, as they each would have the MAC ID of the physical AP. If it is desired or required for each of the virtual APs to have a unique BSSID, then various alternative methods may be used. In one embodiment of the invention, the MAC ID of the single physical AP is simply used for all virtual APs, i.e., is used as the BSSID for all virtual APs on that physical AP. Thus, in this embodiment, each of the virtual APs on a single physical AP has the same BSSID. It is currently not believed that this will impact the operation of each of the virtual APs in any way. In an alternate embodiment, where it is desired that each of the virtual APs has a different respective BSSID, then the "local to network" MAC ID address bits which are defined by IEEE are adjusted for each of the respective virtual APs to produce a unique MAC ID for each of the virtual APs.

In yet another alternate embodiment, the physical AP is initially assigned a pool of MAC ID addresses and each of the virtual APs is assigned a unique MAC 117 from this pool, thus providing each virtual AP with a unique MAC ID address, i.e., a unique BSSID. One drawback to this implementation is the need for a larger number of MAC ID addresses than the methods previously described.

In one embodiment, a single physical AP may support both Infrastructure Network mode (BSS) and Ad Hoc Network mode (Independent BSS, or IBSS). In Ad Hoc mode, each AP is just another peer on the network. This may be accomplished by configuring one or more virtual APs for BSS, as described above, and one or more other virtual APs (also on the same physical AP) for IBSS, or Ad Hoc Network mode.

The term "memory medium" is intended to include various types of memory or storage, including an installation medium, e.g., a CD-ROM, or floppy disks 104, a random access memory or computer system memory such as DRAM, SRAM, EDO RAM, Rambus RAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Also, each of the systems described above may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium in one or more of the above systems thus may store a software program or data for performing or enabling roaming or selective network resource access within a network system 100. A CPU or processing unit in one or more of the above systems executing code and data from a memory medium comprises a means for executing the software program according to the methods or flowcharts described below.

Various embodiments further include receiving or storing instructions and/or data implemented in accordance with the present description upon a carrier medium. Suitable carrier media include memory media as described above, as well as signals such as electrical, electromagnetic, or other forms of analog or digital signals, conveyed via a communication medium such as networks and/or a wireless link.

Figure 2:
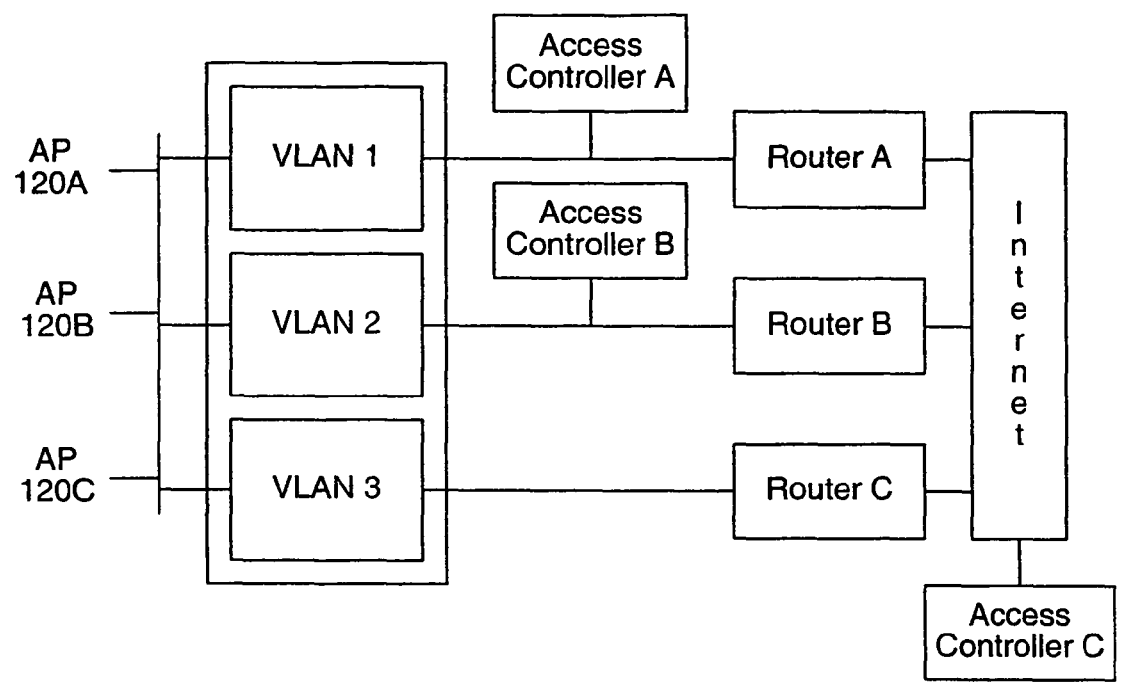
FIG. 2 is a more detailed block diagram of one embodiment of the wireless network system of FIG. 1.
Figure 3:
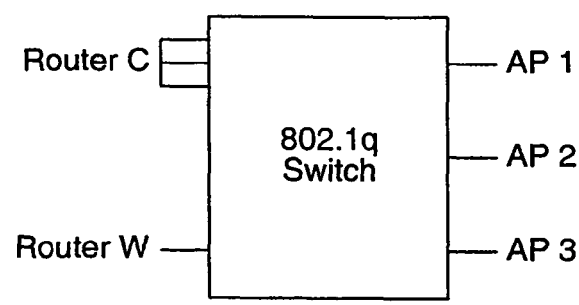
FIG. 3 is a block diagram of another embodiment of the wireless network system of FIG. 1.

FIGS. 2 and 3: Block Diagrams of the System of FIG. 1

FIG. 2 is a more detailed block diagram illustrating a portion of the wireless network system of FIG. 1. FIG. 2 illustrates an embodiment having three access points 120 (A-C) which couple to respective VLANs, labeled VLAN1, VLAN2 and VLAN3. VLAN1, VLAN2 and VLAN3 in turn couple to respective routers 160, labeled router A, router B and router C, which are provided by wireless service providers A, B and C respectively. These routers in turn couple to the Internet 170. As shown, one or more access controllers, e.g., computer systems configured to determine or control network service access, may be provided for each of the wireless service providers. The access controllers operate to verify user or subscriber access to the respective provider's network. FIG. 2 illustrates access controller A, access controller B and access controller C. As shown, access controllers A and B are coupled to router A and router B respectively. However, the access controller may be located outside of the local network 130, e.g., may be comprised on any of various locations on the Internet, as shown with respect to access controller C.

In this embodiment, the data structure may store an identification information/VLAN tag mapping, e.g., an SID/VLAN tag mapping, which operates to map the user to the appropriate VLAN of the user's wireless service provider. Thus, on the wired network to which the access points 120 are connected, the use of a different VLAN for each wireless service provider operates to separate data traffic on the wired network for each of the wireless service providers. It should be noted that one or more of the access points 120 may include software which implements a plurality of virtual access points, described above, each of which may correspond to a particular wireless service provider or VLAN.

As shown, each of VLAN1, VLAN2 and VLAN3 may be supported by one or more Ethernet switches which support tagged VLANs (IEEE 802.1q). In addition, each switch may also support IEEE 802.1p, which provides for various quality of service (QoS) metrics. This enables the switches to enforce certain predefined quality of service metrics for any given port or virtual port contained within the network. As shown in FIG. 3, it is also noted that a router may be present on more than one VLAN. As shown, FIG. 3 includes an 802.1q switch which couples to three access points referred to as access point 1 (AP1), access point 2 (AP2), and access point 3 (AP3). As shown, a router labeled Router C may be coupled to two or more VLANs as shown.

Using VLANs, each access point 120 preferably has the ability to transmit/receive on one or more VLAN IPs to one or more wireless service providers. This permits, but does not require, that each wireless service provider use its own network numbering plan. At most, each wireless service provider may have an access controller and a router at each coverage location. As shown in FIGS. 2 and 3, the access controller is not required to be physically located at the coverage location, but rather may be located anywhere.

Figure 4:
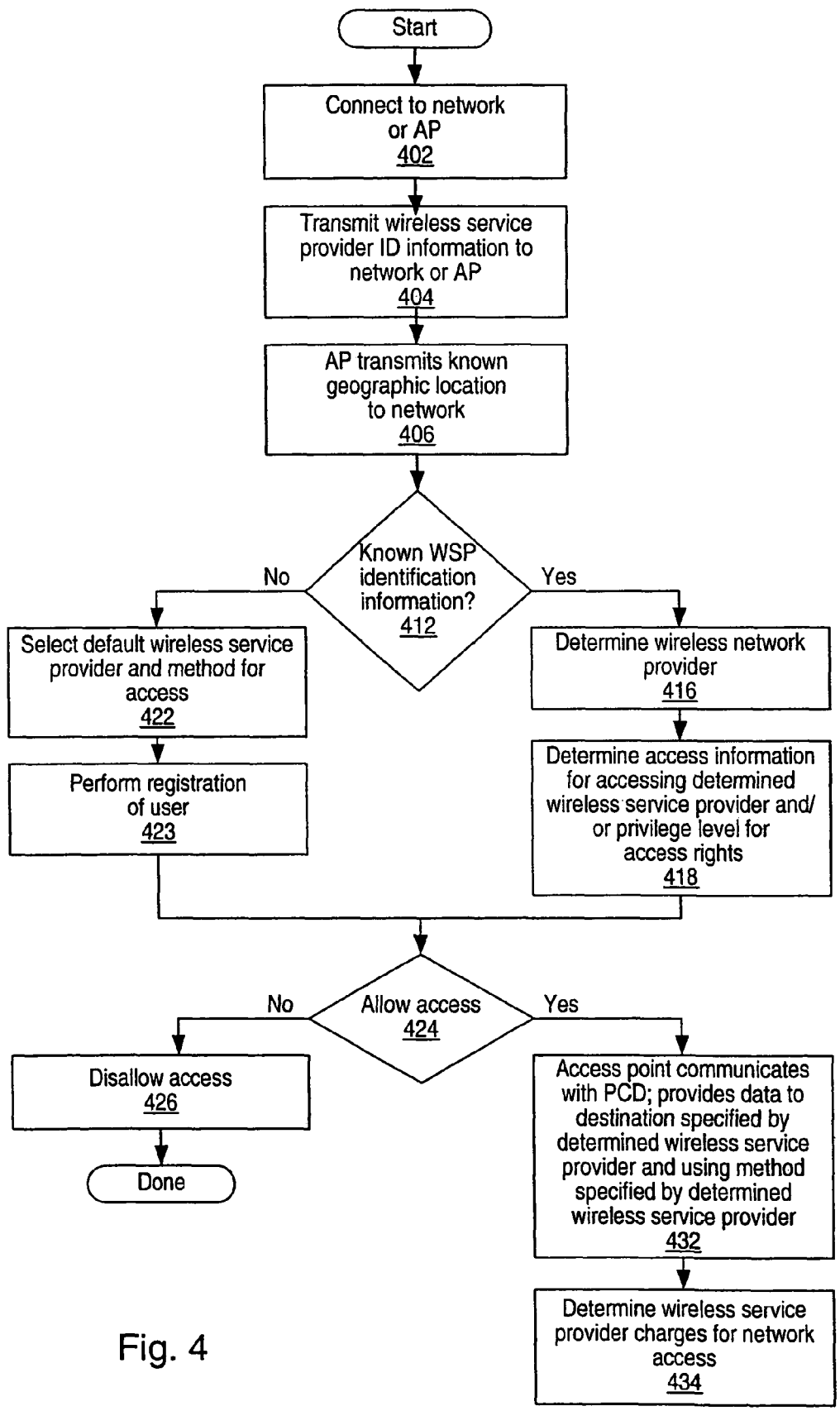
FIG. 4 is a flowchart diagram illustrating operation of allowing access to a wireless network system using a multiple subscriber model.

FIG. 4—Multiple WSP Network Access

FIG. 4 is a flowchart diagram illustrating a method of allowing roaming access and/or selective access to a wireless network system. In one embodiment, as described above, the PCD 110 includes wireless service provider identification information (called "identification information" herein), preferably comprising a System ID, stored in the memory of the PCD 110. The identification information may include information which identifies one (or more) wireless service providers to which the user of PCD 110 is a subscriber. As noted above, the System ID may be an IEEE 802.11 SSID or ESSID. The wireless service identification information may also be an IP address in a Bluetooth wireless network.

The network access method of the present invention may be operable to receive and use the identification information to facilitate roaming, e.g., to allow a particular wireless service of a plurality of possible wireless services to be selected and used for a user operating on the network. As discussed further below, the identification information may also store access level information which may be used to indicate a network access or privilege level. This stored access level information may be used to selectively allow user access to different parts of the network.

As shown, in step 402 the user connects to the network (e.g., to an access point of the network). For example, the user may be walking in an airport with a portable computing device and may connect in a wireless fashion to an access point located at the airport. In another scenario, the user may enter a hotel room and connect in a wireless fashion to an Ethernet port in his/her room which is connected to the network. In another scenario, the user may enter an office of a business, such as a law firm or corporation, and may connect in a wireless fashion to an access point located in that office. Thus, the user may connect to the network or an access point of the network in any of various locations in a wireless fashion.

In step 404 the personal computing device (PCD) 110 of the user may transmit wireless service provider (WSP) identification information (ID information) to an access point (AP) 120 of the network. The identification information may take any of various forms. In one embodiment, the identification information comprises a System ID (SID), e.g., an ESSID, according to IEEE 802.11. As discussed above, IEEE 802.11 (wireless Ethernet) is designed to support multiple overlapping wireless LANs in a given coverage area. IEEE 802.11 uses the System ID (SID), or ESSID, to "select" which LAN to use, and thus the access point with which to associate. In this embodiment each System ID may be uniquely associated with a respective wireless service provider, and thus the user may configure the System ID on his/her PCD 110 to uniquely identify the wireless service provider which the user has selected or to which the user has subscribed. The identification information may also or instead be a MAC (media access controller) ID which is comprised on a wireless Ethernet card of the personal computing device used by the user. The MAC ID may perform a similar purpose in selecting the wireless service provider. As noted above, the identification information may take various forms. For example, the identification information may simply comprise the name of the respective provider and the appropriate access information, which may be contained in a digital certificate. In various embodiments, the identification information may comprise other types of wireless service provider identification as desired.

In prior art systems, access points are only able to "listen for" one System ID which corresponds to one wireless service provider. According to one embodiment of the invention, each access point 120 may be operable to "listen for" or "detect" a plurality of different sets of identification information, e.g., a plurality of different System IDs, which may correspond to a plurality of different possible wireless service providers, or which may correspond to unknown wireless service providers. Thus, each AP may be set up to "listen" for all types of identification information, e.g., listen for all SIDs, and to answer all queries from PCDs 110, even if the identification information or SID is not recognized by the particular AP 120. Alternatively, each of the access points may be operable to broadcast requests for identification information. For example, each of the access points may periodically broadcast requests for SIDS. Alternatively, each of the access points may periodically broadcast recognized System IDs to the PCDs, i.e., broadcast the sets of SIDs the access point supports, wherein the PCDs may respond to this broadcast by providing the identification information.

In step 406 the access point 120 to which the user has connected may transmit known geographic location information to the network (e.g., to a wireless service provider on the network). This known geographic location information may originate from the AP 120 or from the PCD 110 of the user. As discussed further below, this known geographic location information may be used in various ways. For example, the geographic location information may be used in selecting among two or more possible wireless service providers to which the user has previously subscribed, or may be used in selecting the default provider.

The geographic location information may also be used in determining the network services or access privileges of the user, or used in determining charging aspects of the use. For example, this known geographic location information may be used to determine whether a third party pays for the network access of the user. As one example, an employer of the user (employee) may have previously directed that the employer will pay for network access of the employee if the employee is located in an airport or hotel, but not if the employee is located, for example, in a bar. The known geographic location may also be used to determine a charge rate, based on various incentive or sponsorship programs of which the user is a member. For example, the user may receive a discount if he/she uses network access from certain locations, such as a certain business, a certain airport club, etc. The known geographic location information may also be used to selectively provide different access or privilege levels based on the geographic location, e.g., a user may have greater privilege/access levels at a first geographic location than from a second different geographic location. This known geographic location information may further be used to provide services to the user which are dependent upon the geographic location of the user. For more information on the use of geographic location information for providing geographic based services, please see U.S. Pat. No. 5,835,061, referenced above.

In step 412 the wireless service provider may examine the received identification information, e.g., the System ID, or other identification information and determine whether the received identification information is known or recognized. In step 412 the method may also determine if other id information is valid. If the identification information is determined to not be known, e.g., the System ID is unknown, then in step 422 the method may perform processing to account for the unknown identification information. Step 422 may also involve performing processing for an unknown or incorrect digital certificate or other unknown information.

In step 422, where the identification information is determined to not be known or recognized, the method may select a default wireless service provider for the user for network access. The default wireless service provider may be the provider who maintains the wireless network system being used, or may be a randomly selected provider. In step 423 the user may be required to register with this provider to gain network access. This provider may then arrange for ad hoc billing of the user, such as by credit card. For example, the provider may present a web page on the user's PCD 110 requesting the user to enter credit card information for access to the network. Operation then proceeds to step 432.

Also, if the identification information is determined to not be known, the access or privilege level of the user may be set to the lowest possible level. This, for example, may allow the user to only have access to certain limited local resources, but no external access, e.g., to the Internet. Thus, for example, where the APs 120 are located in an airport, the user having a low access level, e.g., the user whose identification information is not known, may be granted access to certain local resources, such as coffee shops, bookstores, and advertising on the local LAN at the airport, but may not be provided with Internet access. Access to local resources may be allowed since this does not require the use of external facilities and hence does not consume off-property bandwidth, and thus is relatively inexpensive to provide. Alternatively, if the identification information of a user is determined to not be known, the system may provide some form of external access, which may be billed separately by an external Internet provider, without the user being able to view or use any local network resources.

If known identification information is determined to be received in step 412, then in step 416 the method may determine the wireless service provider which corresponds to the identification information (e.g., the System ID). In the preferred embodiment, a data structure comprising wireless service provider information is stored in each of the access points 120. In this embodiment, the respective access point with which the user is communicating receives the identification information and uses the identification information to obtain the appropriate or corresponding wireless service provider to which the user of the PCD 110 is subscribed. In step 418 the respective access point 120 may also access the data structure to determine the appropriate access method or access level for providing data or packets to the respective wireless service provider. For example, the respective access point 120 may access the data structure to analyze the respective SID 1 VLAN tag to determine the VLAN tag to use for the respective wireless service provider. In one embodiment, the respective access point 120 may instead access this information from a separate data structure stored in MIB 150.

In an alternate embodiment, the PCD 110 of the user may provide all of this information to the access point 120. In this embodiment, the data structure containing the wireless service provider data and access information may not be required to be stored in the access points 120 or on the network. Alternatively, data may be stored on the network 130, e.g., in the access points 120 or in the MIB 150, which is used only to validate this information received from the user.

As discussed above, the data structure is preferably a table comprising a plurality of three-tuples wherein each tuple stores a set of identification information, the corresponding wireless service provider associated with that identification information, and access information associated with that wireless service provider and/or the user. An example of this data structure is shown in FIG. 5. The data structure shown in FIG. 5 includes five different sets of three-tuples. It is noted that the data structure may take any of various forms.

The access information may include an access method, possibly including a destination address, or other method by which data packets are routed to/from the respective site of the wireless service provider, or other method which directs that network access be provided by that wireless service provider. The access information may also include a SID I wired transport mechanism mapping, such as a SID I VLAN tag mapping. The access information may also include an access level or privilege level that indicates which network resources that the user may access, e.g., whether the user is only allowed access to resources on the local network 130, or is only or in addition allowed external access, such as Internet access.

Thus, when the access point 120 receives the identification information, the access point may simply use the identification information to index into a table containing this information to determine the appropriate wireless service provider and the respective access method and/or access level.

It is noted that each of steps 412, 416 and 418, and 422 may be performed as one action or a series of related actions. In other words, when the access point 120 receives the identification information, if the identification information does not index into any of the entries in the data structure or table, then the identification information or System ID is determined to be unknown or not associated with a respective wireless service provider as determined in step 412. In this case, the default provider and default access level may be selected as performed in step 422. If the identification information does index properly into an entry of the table, but the corresponding wireless service provider does not have the necessary equipment to accommodate the user, then this may also be treated as unknown identification information, where another provider or the default provider may be selected as performed in step 422.

If the identification information properly indexes into the table, then in steps 416 and 418 information from the respective entry of the table is accessed and used to determine a corresponding wireless service provider which can accommodate the user's network access, as well as the associated method and access level for providing network access using the wireless service provider.

After the wireless service provider and associated access method 1 level have been determined in each of steps 416 and 418, then in step 432 network access or network services may be provided to the portable computing device 110 through the determined wireless service provider. For example, in step 432 the access point 120 with which the user is communicating may operate to provide data to/from a destination specified by the determined wireless service provider using the method specified by the determined wireless service provider, e.g., the method comprised in the table or data structure. In one embodiment, the access point 120 may operate simply as a bridge or router which operates to forward or route packets to the appropriate destination, e.g., to the wireless service provider's network device 160 or to the provider's site. As noted above, the wireless service provider may provide a network device 160 such as a router, which operates to route packets to the provider's site or otherwise simply allow Internet access to the user. Thus in step 432 the method allows the personal computing device of the user access to the network using the user's provider.

In another embodiment, the access point 120 itself operates as a router to route packets to the determined wireless service provider's site, which may be located on the Internet. Thus, in this embodiment, the wireless service provider may not be required to provide any type of network device 160 to enable network access for its respective subscribers. Rather, data packets from the PCD 110 of the user may be routed to the wireless service provider's site on the Internet, which may be located in any location.

In step 432 data is communicated between the PCD 110 and the respective destination specified by the wireless service provider preferably using a secured technique. Examples of possible secured techniques include Layer 2 forwarding; various tunneling protocols such as PPTP, IPSEC, GRE, and IP-in-IP; and tagged VLANs (IEEE 802.1 q), among others.

In one embodiment, in step 432 the access point 120 operates to direct PCDs 110 to an available communication channel, e.g., an available RF channel or other wireless channel, possibly based on information received from the PCD 110. Thus the access point 120, not the PCD 110, may assign channels for communication. For example, the access point 120 may operate to direct a PCD 110 to an available communication channel (e.g., an RF channel) based on the identification information, e.g., the SID, received from the PCD 110. The access point 120 may also operate to direct the PCD 110 to an available communication channel based on other types of identification or authentication information, or on the determined access level of the PCD. This allows an access point 120 to separate the communication traffic onto different channels based on the wireless service provider being used, or based on the access or privilege level of the PCD 110. For example, the access point 120 may assign a PCD 110 a communication channel based on whether the PCD 110 has access to private portions of the network.

In step 434 the selected wireless service provider may record charges for the network access. In one embodiment, each of the wireless service provider's respective devices 160 may maintain separate charge/billing information for each of their respective subscribers. Thus, the network device 160 of the selected wireless service provider may record charges for the network access of the user. Alternatively, a computer system coupled to the network 130, such as the MIB 150, or another computer system, may receive information from the wireless access point 120 as to the determined wireless service provider, and the computer system may maintain billing/charging information for each of a subset or all of the wireless service providers. In one embodiment, billing information for the user may be stored on the PCD 110 and may be provided to the AP 120.

As noted above, network charging information may also be based on known geographic information, as well as, for example, sponsorship or demographic information of the user, which may be provided to the access point in a digital certificate.

As noted above, the data structure or table containing wireless service provider information may be stored in each of the access points 120. Alternatively, the data structure may be stored in a separate computer system, such as the MIB 150. In this latter instance, each of the access points 120 may operate to forward the identification information to the MIB or other computer system 150, and this computer system may perform steps 412, 416 and 418 of determining the appropriate wireless service provider and corresponding access method, or selecting the default provider. Once the wireless service provider and access method have been determined in this embodiment, this information may be forwarded to the respective access point 120 for proper routing, or the respective access point 120 may forward data received from the PCD 110 of the user to the MIB 150 or an associated router for proper routing to the respective wireless service provider's device 160 or to the appropriate site on the Internet.

Thus, in step 432 the PCD 110 of the user is allowed to obtain network access through his previously chosen wireless service provider, i.e., through the wireless service provider to which the user has previously subscribed. As noted above, the wireless service provider, may operate to maintain billing/charging information through its equipment 160, at its site, or through a shared resource such as MIB 150. As also noted above, the billing information may be stored on the PCD 110 of the user, e.g., in the user's digital certificate. In this case, if the AP 120 answers the query of the PCD 110 and allows access after confirming the identification information, the system allows for roaming and billing. This effectively allows users to roam on various network infrastructures, e.g., allows a user who is a subscriber of wireless service provider A to roam on a network infrastructure operated and maintained by wireless service provider B. Alternatively, certain portions of the network infrastructure may be built and maintained by a third party who is not a wireless service provider, and subscribers of each of the various wireless service providers may be able to roam onto this network, perhaps with a small fee being paid to the manager of the network infrastructure in addition to the fee normally paid to the wireless service provider for network access. Further, users who have never previously subscribed to a wireless service provider may be allowed to communicate with an AP 120 and select a wireless service provider, or be assigned the default wireless service provider, for network access.

Different Access Levels

As noted above, in one embodiment, the data structure or table may store one or more different access methods depending upon an access level received within the identification information. Thus, referring back to FIG. 1, the network 130 may provide certain local network resources as well as external Internet access which may both be available to users having a first access level. Users with a second, lower, access level may not be entitled to external access, but may be simply able to view or utilize certain local network resources on network 130. Users may also be selectively allowed to make 802.11 voice calls using the network, depending on access level.

For example, in an airport scenario, a non-recognized user, or a user paying a lower fee, may have an access/privilege level that only allows him/her access to local content such as various airport advertising, airport information such as the layout of the airport, including where the restrooms, restaurants, etc. are located, flight information, etc., but does not allow the non-recognized user external access, e.g., access to the Internet. A non-recognized user would of course also not have any access to private corporate LANs maintained on this network, such as the corporate LANs of airlines located at the airport.

If the wireless network system provides a mechanism for the user to register or subscribe to a wireless service provider, then the user may do so and receive Internet access through that selected provider. As another alternative, the network system may provide a mechanism for the user to register or subscribe to an external wireless service provider, e.g., an external ISP, perhaps with a small referral fee paid to the maintainer of the network system.

Alternatively, the network 130 may provide various local resources as well as external Internet access which may both be available to users having a first access level, and users with a second access level may not be entitled to view or utilize these local network resources on network 130, but may be simply provided some form of external access, such as external telephone access using Voice over Internet Protocol (VoIP) or possibly a pathway to the Internet.

For example, where the network 130 and one or more wireless access points 120 are comprised in an airport, one or more airlines may maintain various computing resources on the local network 130 which are usable solely by airline employees and personnel. In this embodiment, PCDs 110 of airline employees may comprise identification information which indicates an access level that allows them access to the various computing resources on the network 130. Thus, employees of a first airline such as American Airlines may have first access level information stored on their PCD 110 that entitles them to utilize certain American Airline computing resources on the network 130, whereas employees of Delta Airlines may have second, different, access level information stored on their PCDs 110 which enables use of only Delta Airlines computing resources located on the network 130 etc. Those users who are not airline employees or personnel may have access information stored on their PCDs 110 which only allows them external access to the Internet and use of certain non-private local resources, but does not allow them to view or use any of the private computing resources on the network 130. Thus, PCDs 110 of users may store various access level information comprised within the identification information which selectively allows access to certain resources on the local network 130. This effectively facilitates private and public portions of the network 130.

As another example, consider an office, such as a law firm office or business which maintains one or more wireless or wired access points 120. Employees of the office may have first access level information (possibly of varying degrees) stored on their PCDs 110 which grants there access to selected resources or all resources on this network 130. However, visitors to this office which do not have this privilege or access level may be detected by a wireless or wired access point and not be allowed to view or use any of the resources on the local network 130, but rather may simply be provided a port for complimentary (or billable) external access to the Internet. Thus, a visitor or customer of the business who is physically present in the office and desires Internet access may utilize his PCD 110 to gain access to the Internet through the local network of the office 130, without the visitor or customer being able to view any of the computing resources, file servers, etc., of that local network 130. In addition, if the user's corporate intranet is web-based, the user may be allowed access to his own LAN computing resources remotely. This allows a business to provide customers and visitors with Internet access through its network 130 without compromising the security of the network 130.

As noted above, in one embodiment, the known geographic location information may also be used to selectively provide different access or privilege levels based on the geographic location, e.g., a user may have greater privilege/access levels at a first geographic location than from a second different geographic location. For example, where the network 130 and one or more wireless access points 120 are comprised in an airport, a user may have a greater access level and hence access to more network resources from, for example, an airline club such as an Admiral's club, and the same user may have a lesser access level and hence access to fewer network resources from an airline gate. Thus the access level of a user may be based at least partly on the geographic location of the user. This may possibly be based on various agreements negotiated by service providers to "reward" users who are present at their geographic location. In a similar manner, the network charge rate may also be based on the geographic location of the user.

Thus, in step 418, where the method determines an access method for the wireless service provider, the method may also determine one or more access levels or privilege levels contained within the identification information to determine whether the user should be provided with Internet access or should only have access to local resources on the network. The method may also determine the known geographic location of the user to aid in determining the access level as described above.

In step 432 the access point 120 or MIB 150 or other device operates to provide or route data depending upon this access level. Thus, users with the appropriate access level may have Internet access as well as be able to view and use resources on the network 130, while users lacking this necessary access level may simply be provided with certain local network resources and not have any Internet access. Alternatively, users having a lower access or privilege level may be provided some form of external access, such as local telephone access using VoIP, 802.11 voice calls, or possibly complimentary Internet access, without being able to view or use certain private network resources.

FIG. 6: Selective Access to a Wireless Service Provider

FIG. 6 illustrates one exemplary embodiment, where a PCD 110A of a first user comprises identification information including an access level which indicates that the user has access only to the computing resources on the local network 130. In this instance, once this access level has been verified, such as by a lookup in the table or data structure, data or packets from the PCD 110A may be routed to various computing resources on the local network as shown by the arrows designated "1". For example, packets from PCD 110A may be routed to virtual access point 602B which is associated with local network 130. In contrast, PCD 110B of a second user comprises identification information which includes a higher access level which encompasses accessing local resources on network 130 as well as Internet access. In this instance, in addition to local network access, data or packets may also be routed from the PCD 110B through the access point 120 and directly out to an external access port for Internet access. Thus, the user who does not have the appropriate access or privilege level is able to view or use any computing resources on the network 130, but cannot gain Internet access through the network 130. As noted above, the system can also be configured whereby the user who does not have the appropriate access or privilege level is only allowed Internet access, and users with higher privilege levels are able to view or use computing resources on the network 130.

Thus, the present invention enables two or more wireless service providers to utilize a common set of wireless or wired access points to provide their respective services to a potentially overlapping set of customers. This allows use of a single network infrastructure, which minimally impacts the wireless spectrum available at a location while allowing the maximum possible number of wireless service providers to offer their network access services. In addition, the system and method described herein allows subscribers of a wireless service provider A to be able to use the network access service provided by wireless service provider B in a location otherwise not serviced by provider A without necessarily requiring any relationship with provider B and vice versa. This allows a confederation of wireless service providers to offer network access to a larger footprint of locations, which offers more value to each of their respective subscribers.

The system may thus allow network access from multiple different providers. For example, one communication service may be referred to as a Wayport network (Wayport is a Registered Trademark of Wayport, Inc. of Austin, Tex.). A Wayport network may be compatible with other types of similar networks maintained by other companies. For example, if Wayport networks are installed in the Austin-Bergstrom International airport and similar 'XYZ' networks are installed in a hotel in downtown Austin, a user that has subscribed to Wayport networks may be able to use the services offered at the downtown hotel by XYZ. More specifically, a user that has registered with a Wayport network (e.g., has entered demographic data and agreed to pay transaction costs) may not need to register with XYZ. The user may use other wireless service providers (e.g., XYZ networks) and still only be billed from one company (e.g., the provider of the Wayport network with which the user is registered). This may be accomplished through agreements established between different wireless service providers.

In one example, a Wayport network-registered user attempts to connect to a the XYZ network in the downtown hotel. In the embodiment described herein, the access point 120 maintained by the XYZ network still answers or communicates with the PCD 110, even though the PCD 110 provides identification information that is different from, and possibly not even recognized by, the access point 120. In this example, assume the XYZ network notices from the PCD ID information that the user is not registered on the XYZ network, but is registered on the Wayport network. The XYZ network may perform a verification of the PCD ID by querying a database of registered PCD IDs on the Wayport network. The XYZ network may acquire demographic information from, or using, the credentials of the user. If the credentials of a the user are not acceptable, access to the XYZ network may be denied. If the credentials are acceptable, the XYZ network may grant the user access to various goods, information and/or service providers. The XYZ network may inform the user (via a message on the user's PCD) that there is an additional cost for accessing the XYZ network as a non-registered user. The user may then have the choice of paying the additional fees for the services or disconnecting. In addition, the user may have the option of registering with the XYZ network to avoid paying 'roaming' fees.

Wireless AP Usage of Multiple Channels

A wireless access point 120 can use one of a plurality of different RF (radio frequency) channels for communication with portable computing devices of users. For example, a wireless access point 120 can use one of RF channels 1 through 11. As is well known, RF channels 1, 6 and 11 are non-overlapping, with the remainder of these channels being partially overlapping with other channels.

According to one embodiment of the present invention, each wireless access point can communicate on one or more, e.g. a plurality of or all of, the available wireless channels, e.g., the available RF channels. Furthermore, each access point 120 can control which channel the portable computing device 110 of a client is able to use. In one embodiment, each portable computing device may scan each of the RF channels until it detects a wireless access point 120 at on one of the channels.

In one embodiment, one or more of the wireless access points may each utilize a plurality of the RF channels, e.g., may use each of the non-overlapping channels 1, 6 and 11 to effectively provide up to three times the normal channel capacity. Thus, the wireless access point 120 may be able to control allocations of a plurality or all of the respective RF channels to selectively obtain higher bandwidth when appropriate, or to simply accommodate a greater number of subscribers. Thus, if a wireless access point using only one RF channel could only handle fifty PCDs 110 on that respective channel, the wireless access point may operate to use all three non-overlapping RF channels to effectively triple this capacity to a total of 150 simultaneous PCDs 110.

As another example, if the wireless access point 120 is only communicating with one portable computing device 110, then the wireless access point 120 may optionally or selectively use each of the three non-overlapping RF channels to produce effectively three times the bandwidth for this communication. As additional portable computer devices engage in communication with the respective wireless access point, 120, the wireless access point 120 may selectively allocate different channels to different ones of these PCDs as needed. Further, if more than three PCDs are communicating with the respective wireless access point, the wireless access point 120 may partition one or more of the respective channels for the respective users, such as by using wireless Ethernet Collision Sense Multiple Access/Collision Detection (CSMA/CD) or other multiple access schemes such as TDMA, FDMA, or CDMA, among others.

In one embodiment, as described above with respect to step 432, the access point 120 operates to direct PCDs 110 to an available channel, possibly based on information received from the PCD 110. Thus the access point 120, not the PCD 110, may assign channels for communication. For example, the an access point 120 may operate to direct a PCD 110 to an available communication channel (e.g., an RF channel) based on the identification information, e.g., the SID, received from the PCD 110. The access point 120 may also operate to direct the PCD 110 to an available communication channel based on other types of identification or authentication information, or on the determined access level of the PCD. This allows the access point 120 to separate the communication traffic onto different channels based on the wireless service provider being used, or based on the access or privilege level of the PCD 110. For example, the access point 120 may assign a PCD 110 a communication channel based on whether the PCD 110 has access to private portions of the network.

Figure 7:
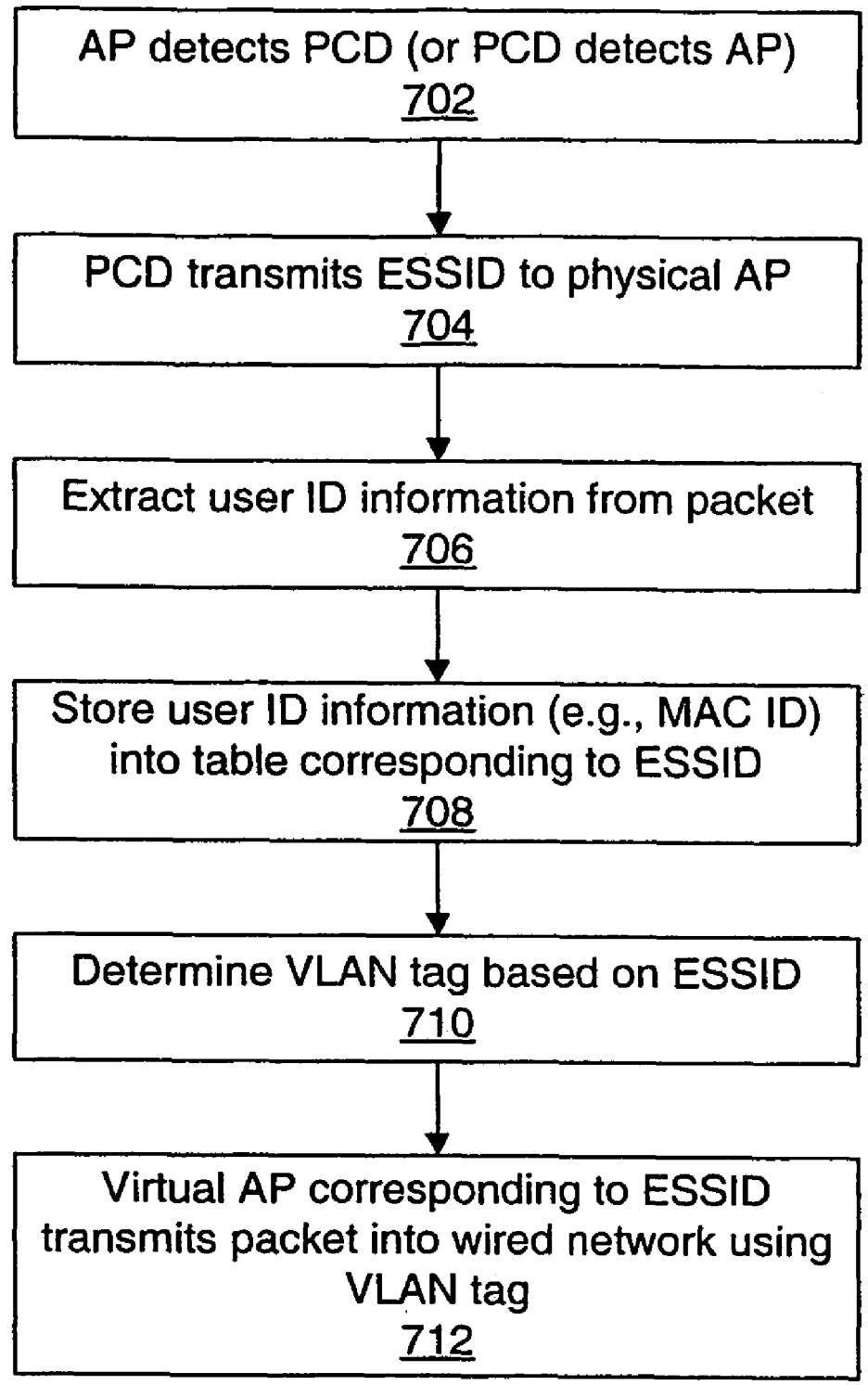
FIG. 7 is a flowchart of initial communication between a PCD and an access point.

FIG. 7: Initial PCD Communication with AP

FIG. 7 is a flowchart diagram illustrating operation of initial communication of a user's PCD with an access point in a wireless distributed network system, according to one embodiment of the invention. Here it is presumed that a user having a PCD comes within proximity of an AP and begins wireless communication with the AP. As shown in step 702 the AP detects the PCD. Here it is noted that several different mechanisms may be used to initiate communication between an AP and a PCD. In one implementation, the PCD may transmit a "probe" signal to the AP containing an SID, e.g., an ESSID as specified in IEEE 802.11, indicating a particular WSP. Here it is presumed that the PCD stores the SID, e.g., the ESSID, corresponding to a pre-selected WSP to which the user of the PCD has previously subscribed. The AP may then respond to the probe by transmitting connection information corresponding to this ESSID. In this implementation, the PCD simply transmits the ESSID to the AP to indicate to the AP the selected WSP of the PCD. In a second implementation, the AP may "beacon" or provide continuously a list of ESSIDs corresponding to all of the WSPs that are supported by that AP. As noted above, each supported WSP has a corresponding ESSID and also has a corresponding virtual AP, i.e., virtual AP software comprised on the physical AP that implements or presents a virtual AP that is used for that WSP. In this implementation, the AP continuously broadcasts or beacons the list of possible ESSIDs. The PCD receives this beacon, analyzes the possible ESSIDs, and selects an ESSID to provide back to the AP. For example, if the PCD has previously registered with or subscribed to a chosen WSP, and the PCD detects that the ESSID of this previously selected WSP is included in the beacon, then the PCD typically will select the WSP and transmit the ESSID corresponding to the previously selected WSP. If the PCD has previously subscribed with a WSP that is not present in the list of beaconed ESSIDs that are beaconed by the AP, then the PCD may use some secondary choice or algorithm to select a WSP that is supported by this AP, even though the PCD may not have previously subscribed with or have a relationship with this WSP. For example, the PCD may simply select a default WSP from the list of available WSPs if the preferred WSP is not supported by that AP. Alternatively, the PCD may analyze signal strength or may utilize billing/charging information in evaluating which WSP to select based on the list of available WSPs as indicated by the list of ESSIDs transmitted by the AP.

In step 704 the PCD then transmits the ESSID to the AP in a data packet. As noted above, the transmitted ESSID may be the ESSID that is stored on the PCD which corresponds to the WSP previously selected by the PCD, i.e., to which the PCD has previously subscribed. Alternatively, the PCD may transmit an ESSID that is selected from a list of possible ESSIDs beaconed by the AP.

In step 706 the software executing on the AP (or device coupled to the AP) operates to extract user ED information from the packet received from the PCD. In one embodiment, the user identification information may comprise a MAC ID of the network interface card (NIC) comprised on the PCD. Alternatively, the user ID information may comprise any other information that is suitable for particularly identifying either the user or the PCD of the user. The user ID information is preferably comprised in each packet transmitted by the PCD to enable each packet to be properly routed to a corresponding virtual AP and wired transport mechanism as discussed below.

In step 708 the software executing on the AP stores the user ID information, e.g., the MAC ID, into a table corresponding to the ESSID transmitted by the PCD in step 704. Thus, in step 708 the user ID information is associated with the ESSID and hence with the selected WSP. As discussed further below, this table can later be accessed on receipt of subsequent packets to associate the user ID information contained in received packets with the corresponding ESSID and hence with the chosen WSP and corresponding wired transport mechanism, e.g., VLAN tag.

In step 710 the AP determines the wired transport mechanism, e.g., the VLAN tag based on the ESSID.

Figure 8:
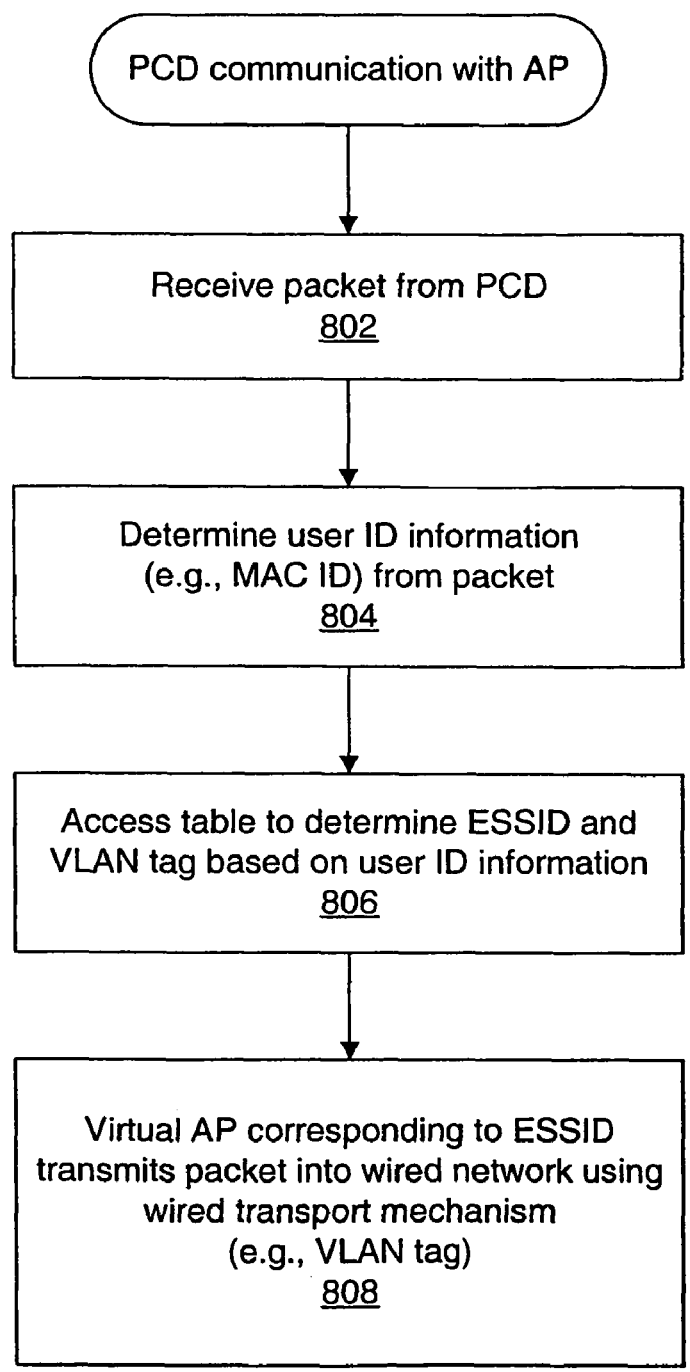
FIG. 8 is a flowchart of communications between a PCD and an access point.

Finally, in step 712 the virtual AP software corresponding to the determined ESSID executes and operates to transmit the packet into the wired network (VLAN) using the wired transport mechanism, e.g., using the ULAN tag that corresponds to the ESSID, FIG. 8: PCD Communication with AP FIG. 8 is a flowchart diagram illustrating operation of PCD communication with an AP after an association event has occurred, i.e., after the method described in FIG. 7 has been executed to create an entry in the table of the AP associating the user 1D information of the PCD with a corresponding ES SID and hence with a selected WSP.

As shown, in step 802 the AP receives a packet from the PCD. Each packet provided from the PCD comprises or includes user ID information which identifies the source or the PCD from which the packet originates.

In step 804 the AP determines the user ID information comprised within the packet. In one embodiment, the user ID information is a MAC ID as discussed above. However, the user ID information may comprise other types of identification, such as an IP address as specified in the Blue Tooth wireless communication standard.

In step 806 the AP accesses the table comprised within the AP to determine the corresponding ESSID and wired transport mechanism based on the user ID information. In other words, when the association event occurs initially between the PCD and the AP, the table entry is created as described above in step 708; this table is then accessed on receipt of subsequent packets transmitted by the PCD to determine the ESSID and wired transport mechanism, e.g., VLAN tag, based on the user ID information. Thus, the table association created in step 708 is accessed in step 806 for each subsequent packet.

In step 808 the virtual AP software corresponding to the determined ESSID transmits the packet received from the PCD onto the wired network using the determined wired transport mechanism. For example, the virtual AP may transmit the packet onto a LAN using the VLAN tag determined in step 806.

Figure 9:
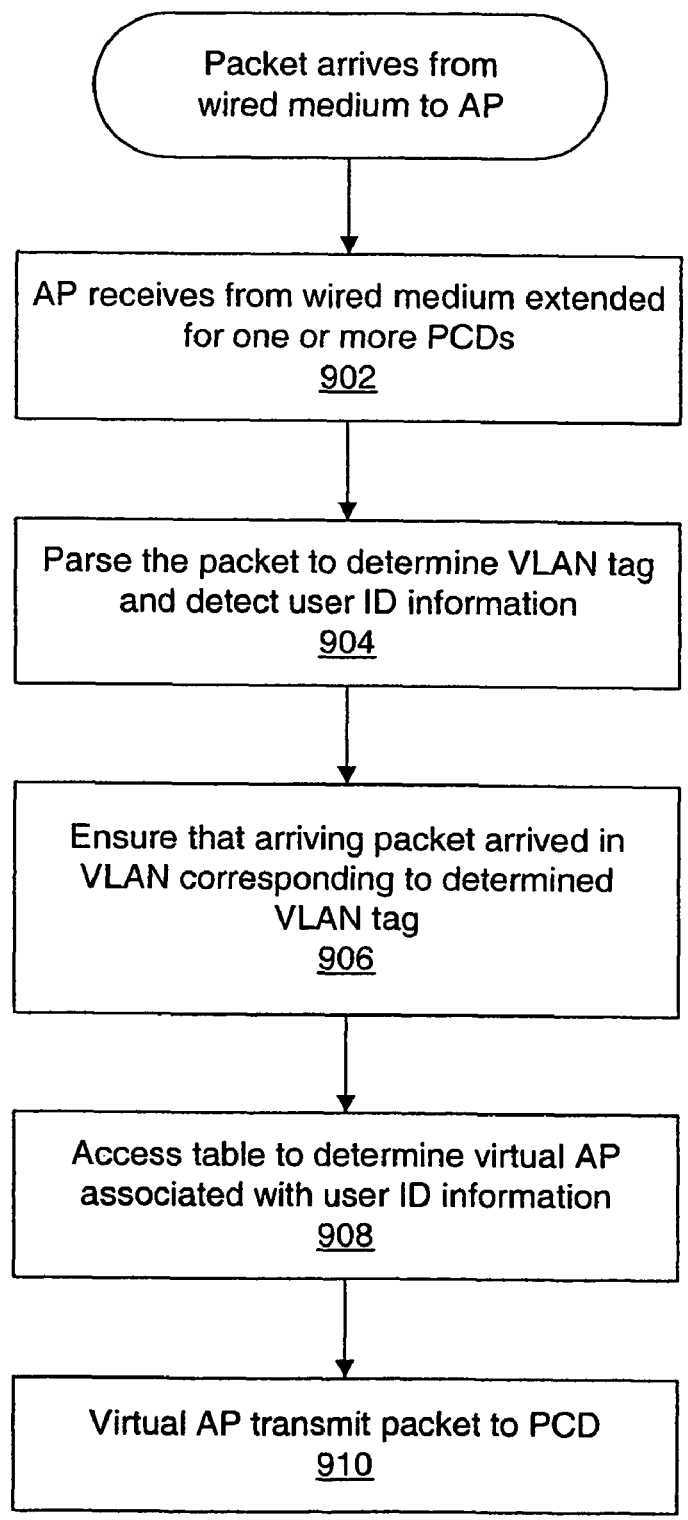
FIG. 9 is a flowchart of the process of packets arriving from a wired medium to the AP which are destined for a PCD.

FIG. 9: Packets Arriving from Wired Medium to the AP Destined for a PCD

FIG. 9 is a flowchart diagram illustrating operation when incoming packets arrive at the AP from the wired medium which are destined for one of the PCDs in communication with the AP.

As shown, in step 902 the AP receives a packet from the wired medium that is intended for one or more PCDs that are in communication with the AP.

In step 904 the AP operates to parse the packet to determine the ULAN tag associated with the arriving packet, i.e., or comprised within the arriving packet, and also to determine the destination user ID information contained within the incoming packet. Incoming packets received from the wired medium may include user ID information corresponding to the destination PCD. For example, in IEEE 802.11 wireless Ethernet, the incoming packet may include a MAC ID corresponding to the destination network interface card (NIC) of the PCD. This user ID information is extracted or obtained from the packet in step 904.

In step 906 the AP may optionally ensure that the arriving packet arrived on a VLAN corresponding to the ULAN tag determined in step 904 as a security mechanism. In general, the incoming packet should arrive on the ULAN corresponding to the VLAN tag contained or comprised within the packet. If this is determined to not be the case in step 906, than the packet may be a spurious packet or present a security issue, and the packet may simply be dropped.

In step 908 the AP software accesses its table(s) to determine the virtual AP associated with the user ID information obtained in step 904. Thus, in step 908 the user ID information may be used in conjunction with the table to determine the virtual AP corresponding to the user ID information. As noted above, there is preferably a 1 to 1 correspondence between an ESSID, a corresponding wireless service provider, and a corresponding virtual AP.

In step 910 the virtual AP software executes on the physical AP to wirelessly transmit the packet received from the wired medium to the PCD as a wireless transmission.

Therefore, FIGS. 7, 8 and 9 disclose one embodiment of a system and method operating in a distributed wireless network system based on IEEE 802.11 wireless Ethernet which operates to allow multiple wireless service providers to use a common network infrastructure. Additionally, the system and method described above with reference to FIGS. 1-9 allows a plurality of service providers to utilize a common set of access points to provide service to a potentially overlapping set of customers, thus providing subscribers or users with the ability to more fully utilize the existing network infrastructure. The system and method further provide a distributed wireless network system which can selectively provide different access levels to users of the system.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the invention as detailed within the following claims.

What is claimed is:

1. An access point for providing network access to a plurality of computing devices, wherein the access point is configured to couple to a network, the access point comprising:
   a wireless transceiver;
   a processor;

a tangible memory medium coupled to the processor, wherein the memory medium stores program instructions executable by the processor, wherein the program instructions are executable to:

instantiate and concurrently execute a plurality of virtual access point instances, wherein each virtual access point instance includes a wireless network protocol stack and wherein each virtual access point corresponds to a unique System ID of a plurality of System IDs (SIDs);

wherein each virtual access point instance of the plurality of virtual access point instances is operative to implement a wireless local area network identified by its corresponding unique SID and provide network access to one or more wireless communication devices.

2. The access point of claim 1 wherein each of the plurality of virtual access point instances is operative to utilize a common Basic Service Set Identifier (BSSID).

3. The access point of claim 1 wherein each of the plurality of virtual access point instances is operative to utilize a unique Basic Service Set Identifier (BSSID).

4. The access point of claim 1 wherein each of the plurality of virtual access point instances is operative to cause the wireless transceiver to broadcast its corresponding SID in wireless beacons.

5. The access point of claim 1 wherein each of the plurality of virtual access point instances is operative to tag received wireless frames with virtual Local Area Network (VLAN) identifiers that are assigned to the respective virtual access point instance.

6. The access point of claim 1, wherein each wireless network protocol stack comprises an IEEE 802.11 protocol stack.

7. The access point of claim 1, wherein the plurality of SIDs comprise a plurality of IEEE 802.11 System IDs.

8. The access point of claim 1, wherein the plurality of SIDs comprise a plurality of IEEE 802.11 Service Set IDs (SSIDs).

9. The access point of claim 1, wherein the plurality of SIDs comprise a plurality of IEEE 802.11 Extended Service Set IDs (ESSIDs).

10. The access point of claim 1, wherein each of the plurality of SIDs is associated with a unique network service provider and wherein each of the virtual access point instances is operative to direct wireless traffic to respective network destinations corresponding to a network service provider.

11. A method comprising:

concurrently executing, on a single physical access point, a plurality of virtual access point instances, wherein each virtual access point instance includes a wireless network protocol stack and wherein each virtual access point corresponds to a unique System ID of a plurality of System IDs (SIDs);

wherein each virtual access point instance of the plurality of virtual access point instances is operative to implement a wireless local area network identified by its corresponding unique SID and provide network access to one or more wireless communication devices.

12. The method of claim 11 wherein each of the plurality of virtual access point instances is operative to utilize a common Basic Service Set Identifier (BSSID).

13. The method of claim 11 wherein each of the plurality of virtual access point instances is operative to utilize a unique Basic Service Set Identifier (BSSID).

14. The method of claim 11 wherein each of the plurality of virtual access point instances is operative to cause the single physical access point to broadcast its corresponding SID in wireless beacons.

15. The method of claim 11 wherein each of the plurality of virtual access point instances is operative to tag received wireless frames with virtual Local Area Network (VLAN) identifiers that are assigned to the respective virtual access point instance.

16. The method of claim 11, wherein each wireless network protocol stack comprises an IEEE 802.11 protocol stack.

17. The method of claim 11, wherein the plurality of SIDs comprise a plurality of IEEE 802.11 System IDs.

18. The method of claim 11, wherein the plurality of SIDs comprise a plurality of IEEE 802.11 Service Set IDs (SSIDs).

19. The method of claim 11, wherein the plurality of SIDs comprise a plurality of IEEE 802.11 Extended Service Set IDs (ESSIDs).

20. The method of claim 11, wherein each of the plurality of SIDs is associated with a unique network service provider and wherein each of the virtual access point instances is operative to direct wireless traffic to respective network destinations corresponding to a network service provider.

* * * * *